United States Patent
Kobayashi et al.

(10) Patent No.: US 8,540,578 B2
(45) Date of Patent: Sep. 24, 2013

(54) NETWORK GAME SYSTEM AND CLIENT GAME DEVICE

(75) Inventors: Kaori Kobayashi, Tokyo (JP); Tomoyuki Okawa, Tokyo (JP); Hideya Takahashi, Tokyo (JP)

(73) Assignee: Sega Corporation, Tokyo (JP)

( * ) Notice: Subject to any disclaimer, the term of this patent is extended or adjusted under 35 U.S.C. 154(b) by 232 days.

(21) Appl. No.: 13/060,486

(22) PCT Filed: Jun. 22, 2009

(86) PCT No.: PCT/JP2009/061316
§ 371 (c)(1),
(2), (4) Date: Mar. 8, 2011

(87) PCT Pub. No.: WO2010/024024
PCT Pub. Date: Mar. 4, 2010

(65) Prior Publication Data
US 2011/0151969 A1   Jun. 23, 2011

(30) Foreign Application Priority Data
Aug. 25, 2008 (JP) .................... 2008-215970

(51) Int. Cl.
*A63F 13/12* (2006.01)
(52) U.S. Cl.
CPC .................... *A63F 13/12* (2013.01)
USPC .................. 463/42; 463/40; 463/41
(58) Field of Classification Search
CPC ........................................ A63F 13/12
USPC .......................... 463/40–42, 1–6
See application file for complete search history.

(56) References Cited

U.S. PATENT DOCUMENTS

| 5,275,418 A | 1/1994 | Yiu |
| 6,110,041 A | 8/2000 | Walker |

(Continued)

FOREIGN PATENT DOCUMENTS

| GB | 2 407 998 | 5/2005 |
| GB | 2 445 123 | 6/2008 |

(Continued)

OTHER PUBLICATIONS

International Search Report issued Aug. 18, 2009 in International (PCT) Application No. PCT/JP2009/061316.

(Continued)

*Primary Examiner* — Ronald Laneau
*Assistant Examiner* — Ross Williams
(74) *Attorney, Agent, or Firm* — Wenderoth, Lind & Ponack, L.L.P.

(57) ABSTRACT

A network game system and a client game device increase the attraction and strengthening of friendships between players. The network game system includes game devices, each of which includes a unit that reads out a player ID from an external storage medium, and a server terminal that is communicably connected to the game devices through a network. Presentation process information is used for performing a game presentation associated with a game presentation ID at the time of performing a game and is stored in a managing section. The game presentation ID is set to be used in the external storage medium based on the player ID and is stored in the managing section in association with the player ID. When a predetermined condition is satisfied, information on the use permission setting of the game presentation ID that is stored in the managing section is updated.

8 Claims, 14 Drawing Sheets

(56) References Cited

U.S. PATENT DOCUMENTS

| | | | |
|---|---|---|---|
| 7,163,204 B1 | 1/2007 | Liao | |
| 8,033,915 B2 * | 10/2011 | Saito et al. | 463/42 |
| 8,187,073 B2 * | 5/2012 | Beaulieu et al. | 463/16 |
| 2002/0142825 A1 | 10/2002 | Lark | |
| 2002/0142846 A1 * | 10/2002 | Paulsen | 463/43 |
| 2002/0151366 A1 | 10/2002 | Walker | |
| 2004/0023709 A1 | 2/2004 | Beaulieu et al. | |
| 2004/0092313 A1 | 5/2004 | Saito et al. | |
| 2008/0113716 A1 * | 5/2008 | Beadell et al. | 463/17 |
| 2008/0214311 A1 | 9/2008 | Saito et al. | |

FOREIGN PATENT DOCUMENTS

| | | |
|---|---|---|
| JP | 8-332282 | 12/1996 |
| JP | 2001-129240 | 5/2001 |
| JP | 2004-97610 | 4/2004 |
| JP | 2005-131232 | 5/2005 |
| JP | 2006-288728 | 10/2006 |
| WO | 2007/115449 | 10/2007 |
| WO | 2009/057803 | 5/2009 |

OTHER PUBLICATIONS

Supplementary European Search Report mailed May 31, 2012 in corresponding European Application No. 09809679.5.

European Office Action (in the English language) issued Feb. 7, 2013 in European Application 09 809 679.5.

* cited by examiner

Fig. 13

| PLAYER ID | GAME PRESENTATION ID IN MIDDLE OF SETTING | TYPE OF GAME PRESENTATION | ACQUIRED TIME STAMP | ACQUISITION STATE OF EACH PLAYER | | | | NUMBER OF PERSONS TO WHOM COPY CAN BE MADE |
|---|---|---|---|---|---|---|---|---|
| | | | | [a] | [b] | [c] | [d] | |
| [c] | <<2>> | FLAMES | 2008/04/03 21:00 | ○ | ○ | / | ○ | 0 |
| [a] | <<4>> | FISH | 2008/04/01 23:20 | / | × | × | ○ | 2 |
| [d] | <<3>> | STARS | 2008/03/15 18:00 | ○ | × | ○ | / | 1 |
| [b] | <<1>> | CLOUDS | 2008/02/23 00:30 | × | / | × | × | 3 |

NETWORK GAME SYSTEM AND CLIENT GAME DEVICE

BACKGROUND OF THE INVENTION

1. Technical Field

The present invention relates to a network game system and a client game device that use an external storage medium such as an IC card, and more particularly, to the network game system comprising a game device further including at least an external storage medium processing section for reading out a player ID (identification) that is unique to a player from the external storage medium and a server terminal that is communicably connected to the game device through a network and to the client game device that is communicably connected to the server terminal through the network.

2. Background Art

As the network game system and the client game device of the above type, for example, an electronic dart game device as disclosed in Japanese Patent Application Laid-Open (JP-A) No. 2005-131232 is known. In this electronic dart game device, a plurality of electronic dart game devices (cases) are connected to a network such as the Internet, and communication terminals such as a server, a personal computer (PC) and a cellular phone (mobile phone) and game devices that perform games of types different from a dart game are connected to the network. In each game device, a plurality of card readers in which an ID card that is unique to a player can be inserted is disposed, and data or the like that is specific to the player can be acquired from the server based on a player identification information acquired through the card reader. Further, a player-specific information such as a game score or a game history is stored in the server in association with the player identification information, and the player-specific information can be reflected on the game.

In addition, in Japanese Patent Application Laid-Open (JP-A) No. 2001-129240, a game system configured so as to enable a data communication between at least two image display game devices is disclosed in which identification data is transmitted when the data communication is mutually performed between the game devices, assistance data such as an item that is helpful for the progress of a game is generated based on the identification data, and the assistance data is presented to a player as a gift.

PRIOR ART DOCUMENTS

Patent Documents

Patent Document 1: Japanese Patent Application Laid-Open (JP-A) No. 2005-131232
Patent Document 2: Japanese Patent Application Laid-Open (JP-A) No. 2001-129240

SUMMARY OF THE INVENTION

However, in a conventional network game system and a conventional game device disclosed in Patent Document 1, an information acquired through the player identification information of the ID card is a game score, a game history and the like, and by reflecting only such information on a game, the attraction of the game cannot be sufficiently increased.

In contrast, in the game system disclosed in Paten Document 2, since a server terminal that manages the whole data is not provided, an administrator (or manager) cannot form new assistance data, acquire the distribution state of the assistance data, and adjust the amount of distribution based on the distribution state. Accordingly, there is a problem that such setting for making the assistance data of the latest edition to be frequently in circulation by increasing the amount of distribution or, on the contrary, setting for forming the assistance data having a high scarcity value by limiting the amount of distribution cannot be performed.

In addition, a game system is recently proposed in which a presentation process information is set in advance so that, for example, a screen displayed on a display unit of a game device when performing a game is changed to a decorated game screen (theme screen) that is different from an ordinary screen, and the presentation process information is stored in an ID card when a predetermined condition is satisfied.

The present invention is contrived in consideration of the above-described situations, and an object of the present invention is to provide a network game system and a client game device capable of increasing the attraction of a game and enhancing the friendship between players by assigning a presentation process information, which is used for changing a game screen or a game sound to one that is different from an ordinary game screen or an ordinary game sound when a predetermined condition is satisfied, to the players through external storage media.

The above object of the present invention is achieved by a network game system including game devices each including an external storage medium processing section that reads out at least a player ID that is unique to a player from an external storage medium owned by the player, and a server terminal that is communicably connected to the game devices through a network, wherein the server terminal includes a presentation process information managing section that stores a presentation process information used for performing a game presentation associated with a game presentation ID when the game device performs a game, a player information managing section that stores the game presentation ID set to be permitted for use in the external storage medium as an acquired game presentation ID in association with a player ID based on the player ID transmitted from the game device, a player information transmitting section that reads out the game presentation ID, which is set to be used in the player ID, out of the acquired game presentation IDs stored in the player information managing section as a used game presentation ID and transmits the used game presentation ID to the game device when the player ID is received from the game device, and a presentation setting updating section that updates information on the acquired game presentation ID of the player ID that is stored in the player information managing section and transmits an update result to the game device, and wherein the game device includes a player ID transmitting section that reads out the player ID through the external storage medium processing section and transmits the player ID to the server terminal, a presentation process information storing section that stores the presentation process information in association with the game presentation ID, and a game presentation processing section that reads out the presentation process information corresponding to the used game presentation ID from the presentation process information storing section and performs the game presentation in accordance with the used game presentation ID of the player ID transmitted from the server terminal.

The above object of the present invention is achieved by a client game device that is communicably connected to a server terminal through a network and has an external storage medium processing section that reads out at least a player ID that is unique to a player from an external storage medium owned by the player, the client game device including a presentation performing section that performs a presentation of a game when the game is performed, a presentation process information storing section that stores a plurality of sets of presentation process information associated with a game presentation ID, a player ID transmitting section that reads out the player ID through the external storage medium processing section and transmits the player ID to the server terminal, a game presentation processing section that receives a game presentation ID that is set to be used for the player ID as a used game presentation ID from the server terminal, reads out the presentation process information corresponding to the used game presentation ID from the presentation process information storing section, and performs the game presentation, and an update information receiving section that receives update information on the game presentation ID from the server terminal.

Further, the above object of the present invention is achieved by the client game device, wherein the server terminal includes a presentation process information managing section that stores the presentation process information associated with the game presentation ID, a player information managing section that stores the game presentation ID set to be permitted for use in the external storage medium as an acquired game presentation ID in association with the player ID based on the player ID transmitted by the player ID transmitting section, a player information transmitting section that reads out the used game presentation ID, which is set to the player ID, out of the acquired game presentation IDs stored in the player information managing section and transmits the read-out used game presentation ID to the game presentation processing section when the player ID is received, and a presentation setting updating section that updates information on the acquired game presentation ID of the player ID that is stored in the player information managing section and transmits an update result to the update information receiving section.

The above object of the present invention is achieved by the network game system, wherein the game device further comprises a display section that outputs a game video based on a control signal, and wherein the presentation process information enables the game presentation processing section to output a game presentation image different from an ordinary game image through the display section.

The above object of the present invention is achieved by the network game system, wherein the game device further comprises a sound output section that outputs a game sound based on a control signal, and wherein the presentation process information enables the game presentation processing section to output a game presentation sound different from an ordinary game sound through the sound output section.

Further, the above object of the present invention is achieved by the network game system, wherein the game device further comprises a case ID transmitting section that transmits a unique case ID that is assigned to each of the game devices to the server terminal, and wherein the server terminal further comprises a presentation assignment setting managing section that stores a presentation assignment setting information enabling the game device to assign a predetermined presentation process information to the external storage medium in association with the case ID transmitted from the game device.

Still further, the above object of the present invention is achieved by the network game system, wherein the presentation setting updating section reads out the presentation assignment setting information associated with the case ID from the presentation assignment setting managing section based on the case ID transmitted from the game device and updates the information on the acquired game presentation ID associated with the player ID of the external storage medium that is stored in the player information managing section so as to set the game presentation ID of the presentation process information to be permitted for use for the external storage medium in which the presentation process information designated in the presentation assignment setting information is not set to be permitted for use.

The above object of the present invention is achieved by the network game system, wherein the presentation setting updating section determines whether or not there is a copiable game presentation ID in the used game presentation IDs set in the external storage media of a plurality of players participating in the game, and, when there is no copiable game presentation ID, reads out the presentation assignment setting information associated with the case ID from the presentation assignment setting managing section based on the case ID transmitted from the game device, selects one external storage medium, in which the game presentation ID of the presentation process information designated in the presentation assignment setting information is not set to be permitted for use, from the external storage media, and updates the information on the acquired game presentation ID associated with the player ID of the one external storage medium that is stored in the player information managing section so as to set the game presentation ID of the presentation process information to be permitted for use for the one external storage medium.

Furthermore, the above object of the present invention is achieved by the network game system, wherein the presentation setting updating section determines whether or not there is a copiable game presentation ID in the used game presentation IDs set in the external storage media of a plurality of players participating in the game and, when there are the copiable game presentation IDs, reads out latest presentation processing information having a latest acquisition time stamp that is not set to be permitted for use for any of the external storage media of the plurality of players from the game presentation IDs and updates the information on the acquired game presentation IDs associated with the player ID of the external storage medium that is stored in the player information managing section so as to set the game presentation ID of the latest presentation process information to be permitted for use for any external storage medium of the plurality of players.

The above object of the present invention is achieved by the network game, wherein the game device further comprises an update section that receives the presentation process information through the network and stores the presentation process information in the presentation process information storing section in association with the game presentation ID by referring to the presentation process information stored in the presentation process information storing section and the presentation process information stored in the presentation information managing section, when there is the presentation process information, which is not stored in the presentation process information storing section, in the presentation process information that is stored in the presentation process information managing section.

According to the network game system and the client game device according to the present invention, a presentation process information used for performing a game presentation associated with a game presentation ID when performing a game is stored in a presentation process information managing section, the game presentation ID set to be permitted for use in an external storage medium based on a player ID is stored as an acquired game presentation ID in a player information managing section in association with the player ID, and an information on the acquired game presentation ID of the player ID that is stored in the player information managing section can be appropriately updated. Accordingly, an information on the acquired game presentation IDs in each external storage medium which is associated with the player ID can be easily changed. As a result, for example, after a game ends in the game device, the used game presentation ID set to be used in the external storage medium owned by a player can be copied so as to be usable in an external storage medium of another player participating in the same game as that of the player. Thus, based on the feelings of the player who desires to acquire and use the presentation process information of the used game presentation ID acquired by other players, a willingness to play a game between players can be increased, and therefore, a communication between the players can be promoted, and the players can enjoy the game without any redundancy.

In addition, the server terminal assigns a case (game device) ID that is unique to each game device, and the game presentation ID can be associated with the case ID. Accordingly, by arranging a specific game device to be an event stage and associating the game presentation ID of a specially-formed game presentation with the case ID that is the event stage, an operation form can be realized in which the game presentation ID of the specially-formed presentation process information that is used for performing a special game presentation can be acquired only when a game is played by using a specific game device. As a result, the administrator side can arbitrarily set the game device which is more appealing to the player desiring to acquire the special game presentation.

Further, by setting the game presentation ID for the presentation process information, the presentation process information can be managed in the server terminal. Accordingly, the administrator can respectively adjust the distribution amount of the presentation process information by accessing the server terminal based on the conditions such as the date of formation, the date set to be distributable, the number of acquired players and the like of the presentation process information.

Therefore, according to the network game system and the client game device, which have the above-described configuration, according to the present invention, the attraction of a game can be increased, and the friendship between players can be enhanced.

BRIEF DESCRIPTION OF THE DRAWINGS

In the accompanying drawings:

FIG. 7A is a front view, FIG. 7B is a perspective view and FIG. 7C is a cross-sectional view of a main portion;

FIG. 8A is a diagram illustrating a state immediately before an arrow hits a segment member, FIG. 8B illustrates a state in which the segment member is displaced to the rear side in accordance with an impact force generated by sticking the arrow into the segment member, and FIG. 8C illustrates a state in which the segment member is returned to the position of its original point;

FIG. 13 is a table illustrating a list example of game presentation IDs that can be copied in the process of a network game system according to the present invention.

DETAILED DESCRIPTION OF THE INVENTION

Hereinafter, embodiments of the present invention will be described with reference to drawings. Although an electronic dart game device including a card reader (an external storage medium processing section) that can read and write data from or into an external storage medium (an IC card or the like) will be described as an example of a game device of a network game system according to the present invention in this embodiment, the present invention is not limited thereto. For example, a home video game device, a game device used for amusement facilities or the like may be used as long as it is a game device using an external storage medium which data can be read from and written into.

Figure 1:
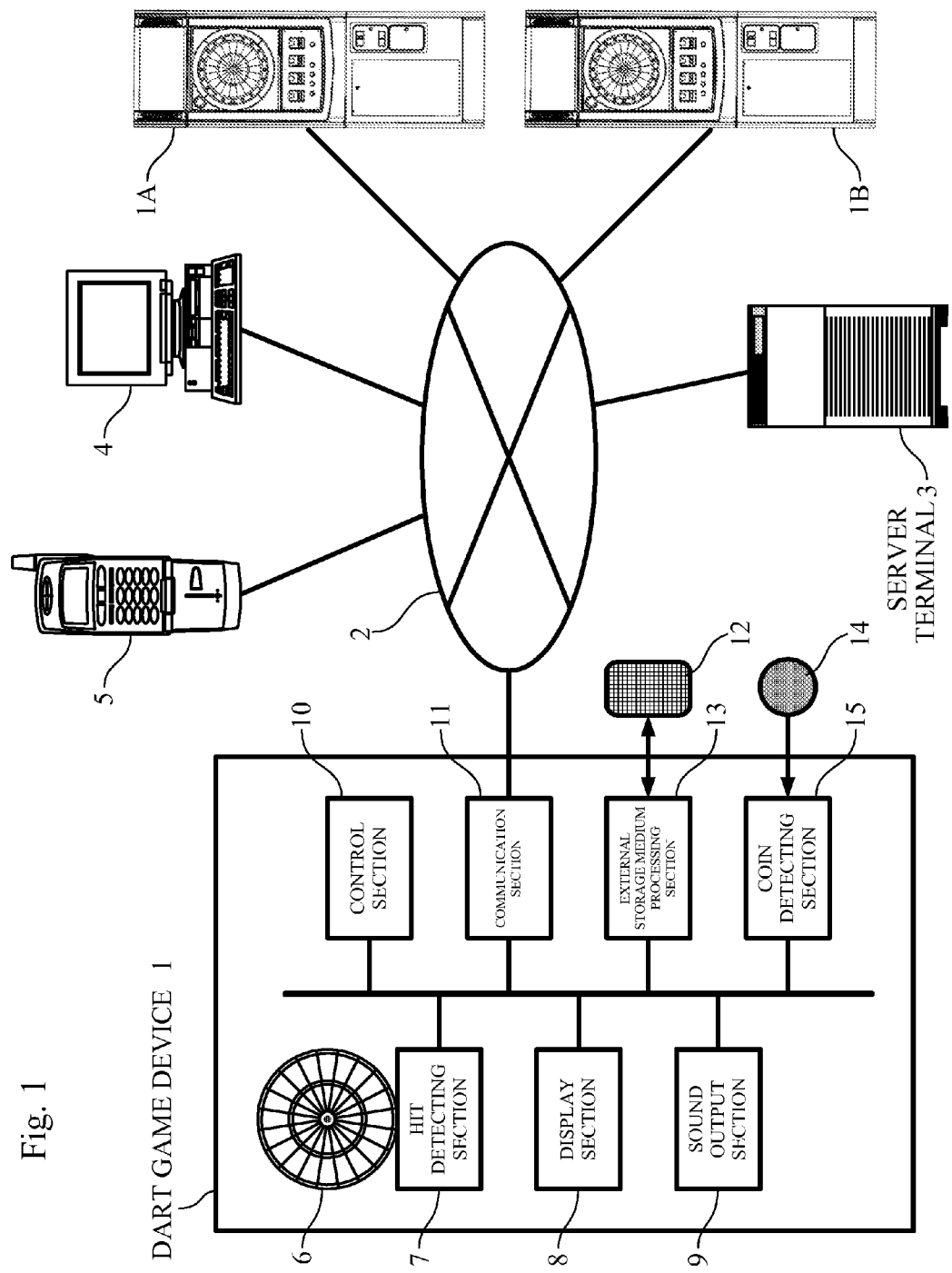
FIG. 1 is a block diagram schematically illustrating an example of the internal configuration and the network configuration of a game device (electronic dart game device) of a network game system according to an embodiment of the present invention.

FIG. 1 is a block diagram schematically illustrating an example of the internal configuration of a game device (electronic dart game device) 1 and the network configuration of a network game system according to the present invention.

In FIG. 1, in a network game system according to this embodiment, a plurality of game devices (in this embodiment, electronic dart game devices) 1, 1A, 1B, . . . are connected to a network 2 such as the Internet, and communication terminals such as a server terminal 3, a personal computer 4 and a cellular phone 5 are connected to the network 2. The server terminal 3 inputs and outputs various types of information to and from the dart game devices 1, 1A, 1B, . . . through the network 2 and controls a game or the like as necessary.

The electronic dart game device 1 comprises: a circle-shaped dartboard 6 that is a target of a dart game; a hit detecting section 7 that detects an area (segment) of the dartboard 6 into which an arrow (soft dart) thrown by a player hits; a control section 10 that controls a dart game and outputs output signals to a display section (liquid crystal display) 8 and a sound output section (speaker) 9 based on a detection result of the hit detecting section 7; a communication section 11 that is connected to the above-described network 2 and transmits or receives data to or from the server terminal 3 and other dart game devices 1A, 1B, . . . through the network 2; an external storage medium processing section 13 that detects an external storage medium (ID card) 12 in which a player ID (player identification information) that is unique to a player is stored; and a coin detecting section 15 that detects insertion of a coin 14 used for performing a game.

When the player ID is detected from the external storage medium 12 by an external storage medium processing section 13, the control section 10 accesses the server terminal 3 through the network 2 from the communication section 11 and obtains data that is unique to the player from the server terminal 3. In addition, the communication terminal such as the personal computer 4 or the cellular phone 5 can transmit or receive various types of data relating to a dart game such as score data, player ranking, or various types of event information to or from the electronic dart game devices 1, 1A, 1B, . . . by accessing the server terminal 3 through the network 2. Accordingly, an image or a message that is displayed on the display section 8 during the dart game, or BGM (Background Music) or a sound effect that is outputted through the sound output section 9 can be set.

Figure 2:
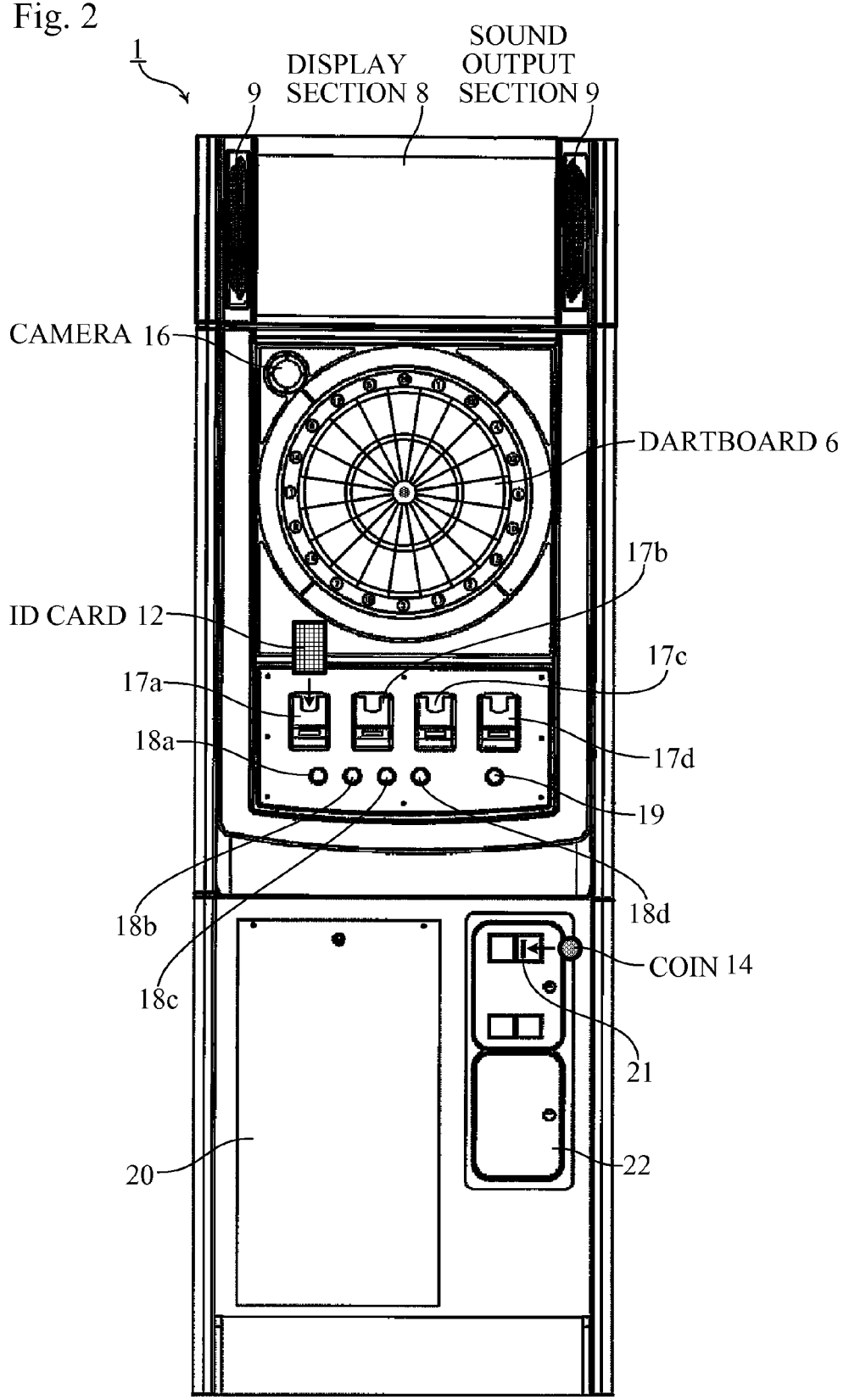
FIG. 2 is a front view illustrating the external appearance of an electronic dart game device.

FIG. 2 is a front view illustrating the external appearance of the electronic dart game device 1 of a network game system according to the present invention.

In FIG. 2, the dart game device 1 comprises the above-described dartboard 6 on the center portion of the case, and in the upper portion thereof, the display section 8 and the sound output section 9 are arranged. In accordance with the progress of a dart game, a predetermined image or text information such as the game score, a game menu, a game description or a game presentation image is displayed on the display section 8, and a sound effect, a voice or the like is outputted from the sound output section 9 in accordance with the dart game.

Further, a camera 16 that images the posture of a player throwing an arrow is installed to the upper left side of the dartboard 6. Generally, the dartboard 6 is configured to have a diameter of 39.37 [cm] (15.5 inches) and a height, from the floor to the center, of 173 [cm], and a throwing line is disposed on the surface of the floor that is located at a position separated by 244 [cm] from the floor located right below the dartboard 6. A player plays the dart game by throwing the arrow from the throwing line toward the dartboard 6. Accordingly, the point of view of the camera 16 is set so as to capture the posture of the player throwing the arrow from the throwing line. In this embodiment, although the camera 16 is installed to the upper left side of the target (dartboard 6) so as to capture the posture (the facial expression or the like) of a right-handed player throwing the arrow appropriately, the installation position is not limited thereto and may be appropriately changed in accordance with the usage situation.

In addition, plural (four) card slots 17a to 17d, four determination buttons 18a to 18d and one selection button 19 are arranged to the lower side of the dartboard 6. In the card slots 17a to 17d, the external storage medium (ID card) 12 in which an IC tag such as an RFID (Radio Frequency IDentification) is buried is inserted. In the external storage medium 12, information such as an identification code of a player, a past game history, a player name that is used during a play or is used for a ranking display, a rank that represents skills, and the latest update dates of various types of data and so on are recorded, and the recorded information is read out by a card reader (the external storage medium processing section) 13 mounted on the rear side of each of the card slots 17a to 17d.

The selection button 19 serves as a button used for selecting a game mode (Zero One, Cricket, Count Up, or the like) before the start of the dart game and serves as a button that is used for a transition to the next round at the end of a round which is configured by one set of three throws (or a switch to a player of the next turn when plural players are present) during the dart game.

Furthermore, the lower portion of the case of the dart game device 1 provides an opening/closing door 20 that is arranged so as to be able to take in and out a control device, a power source device and the like that are housed inside the case, an insertion opening 21 for the coin 15 that is inserted when the dart game is played, and a coin box 22 that houses the coins inserted from the insertion opening 21, and the above-described coin detecting section 15 is arranged in the coin box 22.

Figure 3:
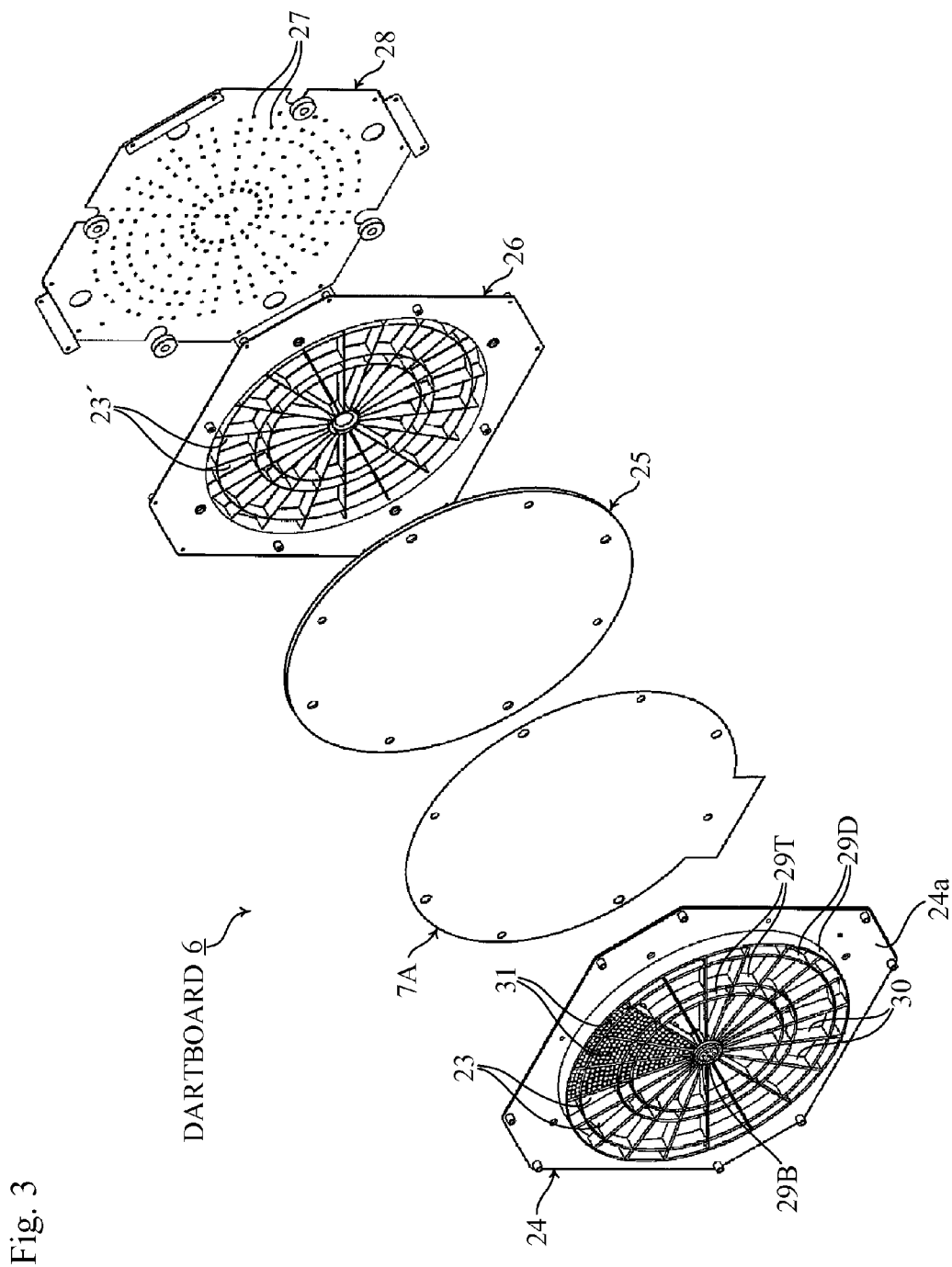
FIG. 3 is an exploded perspective view of a dartboard of an electronic dart game device seen from the front side (the side facing a player)
Figure 4:
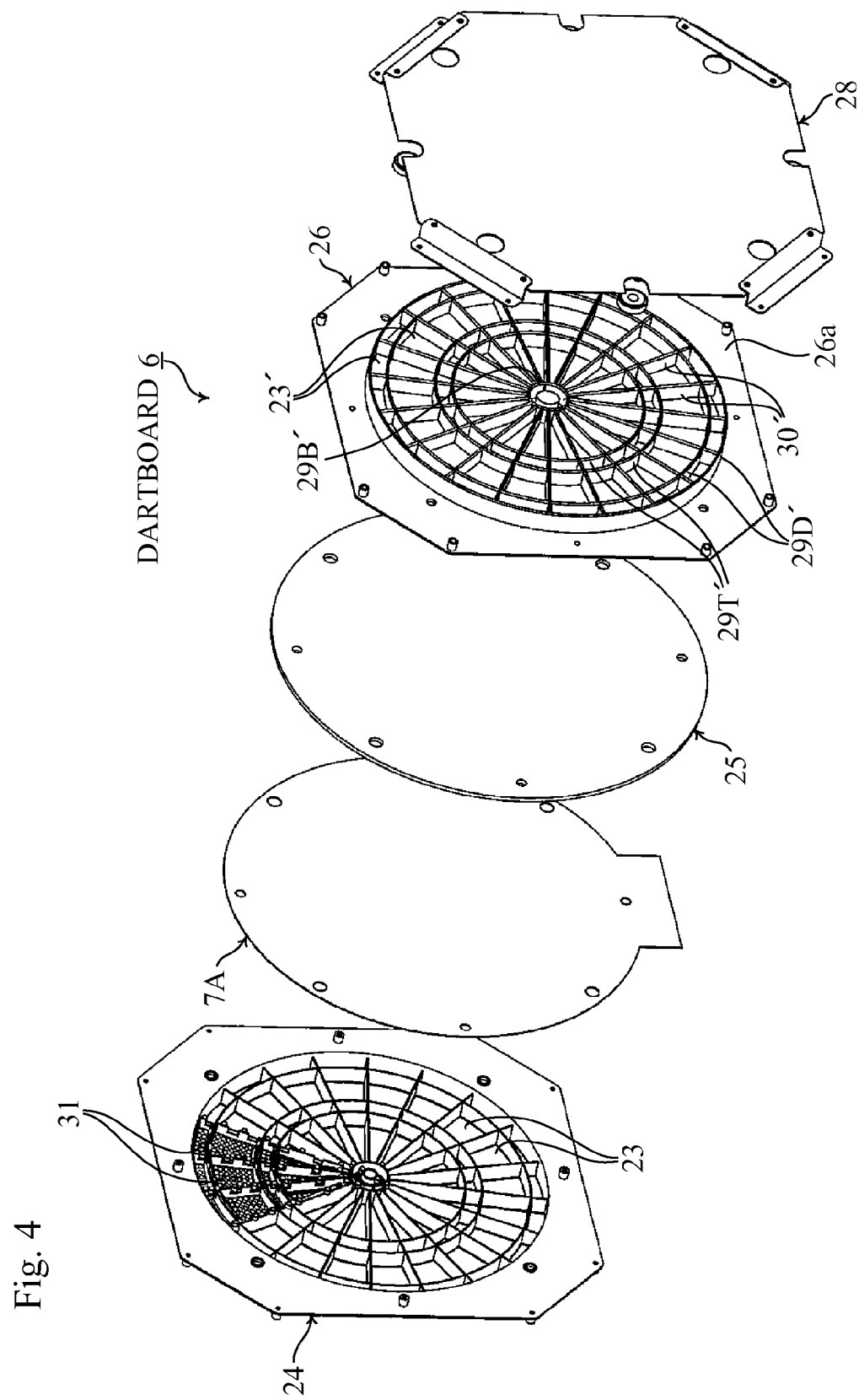
FIG. 4 is an exploded perspective view of a dartboard of an electronic dart game device seen from the rear side.

FIG. 3 is an exploded perspective view of the dartboard 6 seen from the front side (the side facing a player), and FIG. 4 is an exploded perspective view of the dartboard 6 seen from the rear side. In addition, FIG. 5 is a front view of the dartboard 6, and FIG. 6 is a cross-sectional view taken along a line VI-VI shown in FIG. 5.

As illustrated in FIGS. 3 and 4, the dartboard 6 has a structure in which a plurality of plate-shaped members is stacked and comprises: a first partition wall body 24 that defines a plurality of target areas (segments) 23; a sensor sheet 7A that serves as the above-described hit detecting section 7; a diffusion plate 25 that allows light to be surface-emitted from the front side by diffusing the light emitted from a light emitting device to be described later; a second partition wall body 26 that defines a plurality of segments 23, similarly to the first partition wall body 24; and an LED (light emitting diode) substrate 28 on which full-color light emitting diodes (LEDs) 27 which are light emitting devices are mounted.

The first partition wall body 24 is formed by performing a molding process for a resin material such as rigid plastic, and a center circle frame 29B arranged on the center of the target, twenty linear frames 30 that extend from the center circle frame 29B in a radial pattern in the diameter direction, and four concentric frames 29D and 29T forming two sets are integrally provided to stand on a surface of a base portion 24a. Thus, 82 (80+"inner bull"+"outer bull") segments 23 are defined by the center circle frame 29B, the concentric frames 29D and 29T, and the linear frames 30. Each of the segments 23 passes through in the back and forth direction, and segment members 31 having an optical transparent characteristic are housed in all the segments 23.

Figure 5:
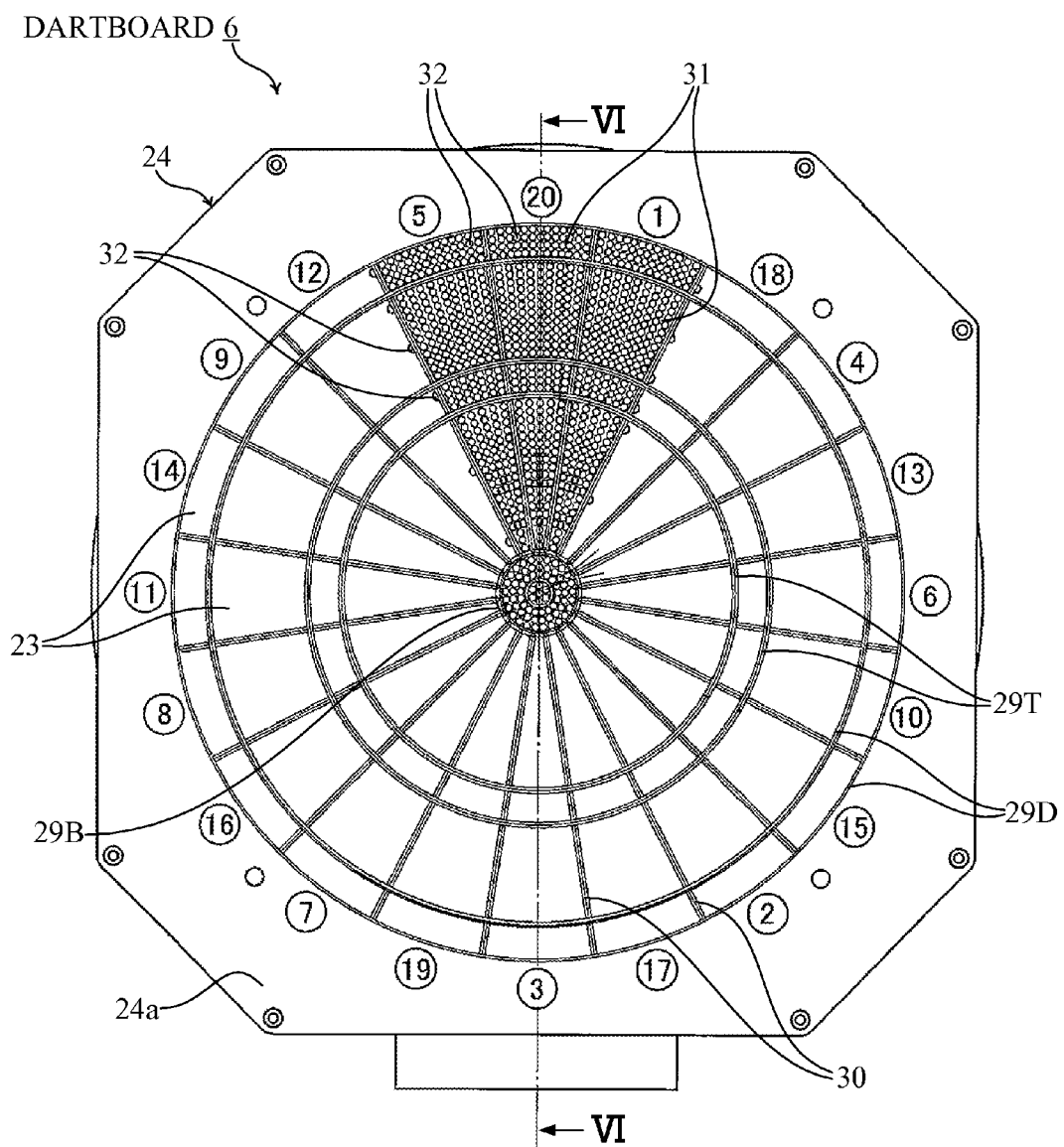
FIG. 5 is a front view illustrating a dartboard of an electronic dart game device.
Figure 6:
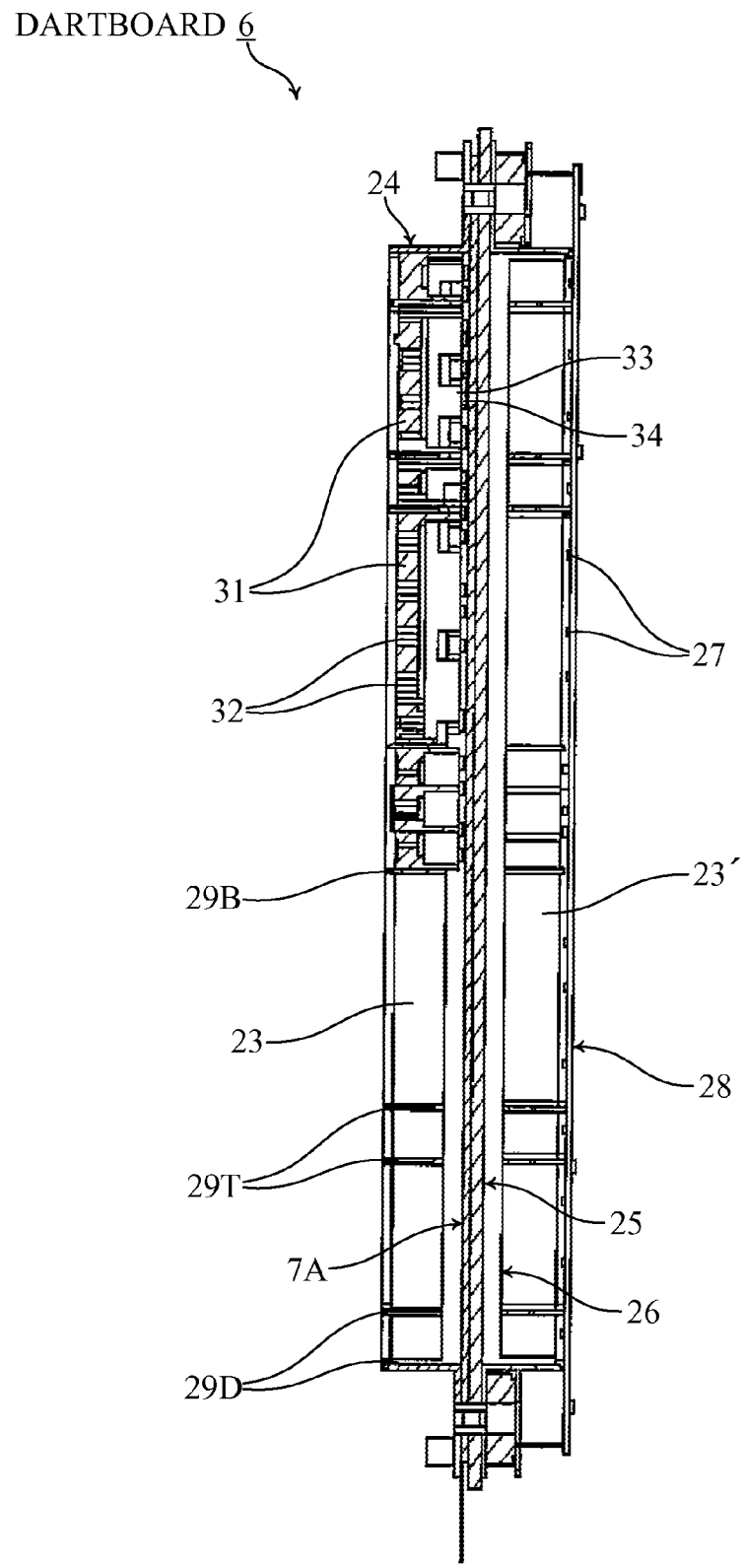
FIG. 6 is a cross-sectional view taken along line VI-VI shown in FIG. 5 illustrating the dartboard of the electronic dart game device.

In FIGS. 3 to 5, for simplification of the description, the segment members 31 are housed only in some segments 23. Since a score acquired when the arrow hit each segment member 31 will be described with reference to FIG. 13, the description thereof is omitted here.

On the front side of each segment member 31, as illustrated in FIG. 5, a great number of housing holes 32 that house a tip end portion of a thrown arrow are formed. In addition, on the rear side of each segment member 31, as illustrated in FIG. 6, one or plural protruded portions 33 is formed, and an elastic body 34 is attached to the end portion of the protruded portion 33. According to such a structure, each segment member 31 is housed to be able to be displaced in the back and forth direction inside each segment 23 of the first partition wall body 24.

Figure 7A:
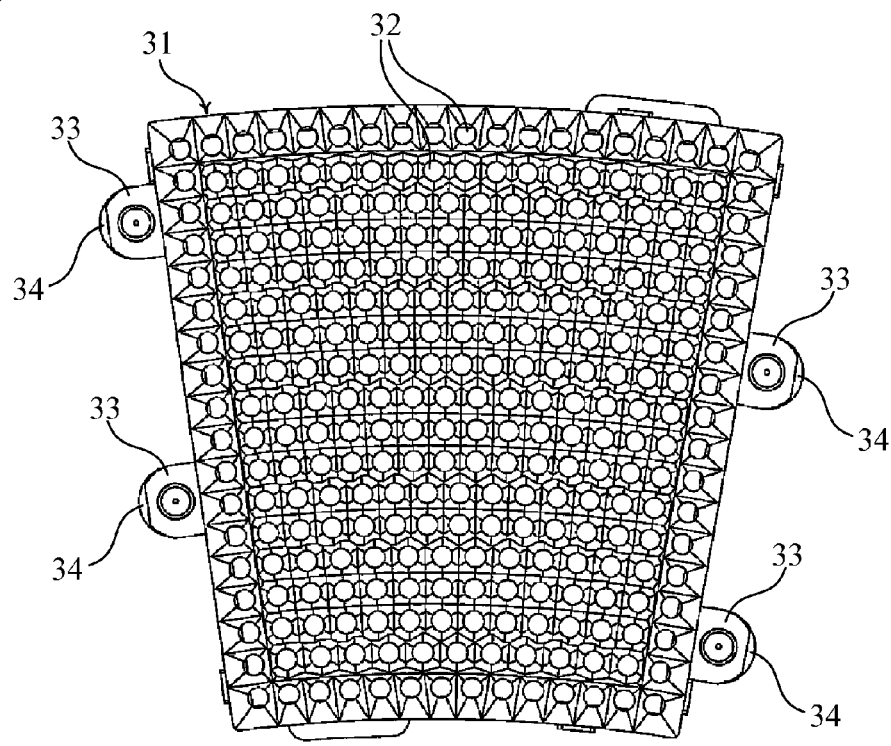
FIGS. 7A to 7C show a segment member that is housed in a segment (single segment) that is defined by the second and third concentric frames from the outer side and two linear frames.
Figure 7B:
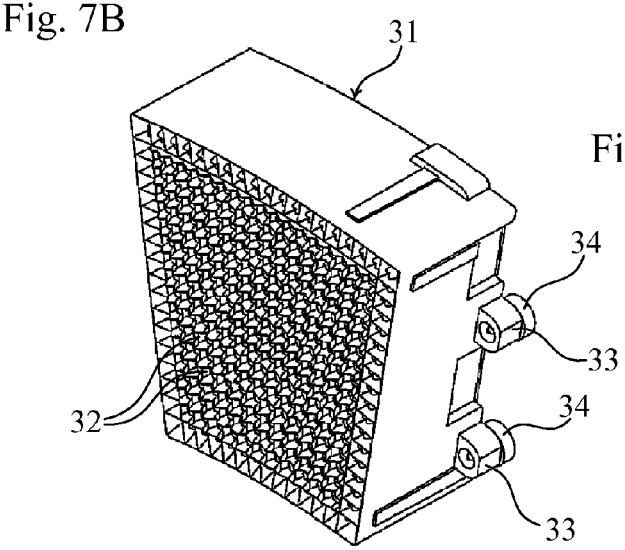
Figure 7C:
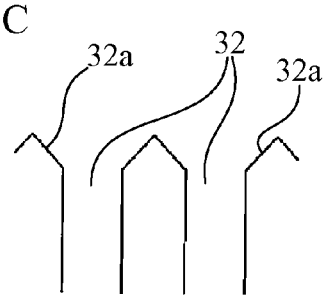

FIGS. 7A to 7C show a segment member 31 that is housed in a segment (single segment) that is defined by the second and third concentric frames from the outer side and two linear frames, and FIG. 7A is a front view, FIG. 7B is a perspective view and FIG. 7C is a cross-sectional view of a main portion.

In FIGS. 7A and 7B, the segment member 31 has a great number of housing holes 32 formed on the front side, as described above, and as illustrated in FIG. 7C, a plane-shaped guide face 32a that is used for guiding the tip end portion of the arrow into the housing hole 32 is formed on the front side of each housing hole 32. The segment member 31 has four protruded portions 33 formed so as to protrude from the left and right side faces, and an elastic body 34 formed from rubber, a spring or the like is attached to the rear face of each protruded portion 33. The amount of protrusion of each protruded portion 33 is set to be approximately the same as the thickness of the linear frame 30, and the protruded portion 33 disposed on the right side and the protruded portion 33 disposed on the left side are formed so as to have different phases in the vertical direction. Accordingly, when two segment members 31 are housed in two segments 23 that are adjacent to each other with the linear frame 30 interposed therebetween, the protruded portion 33 of the segment member 29, which is disposed on the right side and housed in the left-side segment 23 and the protruded portion 33 of the segment member 29, which is disposed on the left side and housed in the right-side segment 23 are arranged in a nest shape on the rear side of the same linear fame 30. In other words, by positioning the protruded portion 33 and the elastic body 34 in an approximately same line as the linear frame 30, the emission light emitted from the rear side, to be described later, is not blocked, and accordingly, good visibility of the dartboard 6 can be obtained.

In addition, although the guide face 32a that is used for guiding the tip end portion of the arrow into the housing hole 32 is conventionally formed in a bowl shape, in this embodiment, the guide face 32a is formed in a plane shape. Accordingly, occurrence of light interference due to the lens function of a bowl-shaped curved face can be prevented, and the guide face 32a is uniformly illuminated.

In the sensor sheet 7A that is arranged on the rear side of the first partition body 24 in which the segment member 31 is housed, a membrane switch is formed at a position corresponding to the elastic body 34 attached to each protruded portion 33 of the segment member 31. Further, the diffusion plate 25 that is arranged on the rear side of the sensor sheet 7A is formed by molding acrylic resin or the like in a circular disc shape, and processed to be slightly uneven (凹凸) on the front and rear faces thereof.

The second partition wall body 26 that is arranged on the rear side of the diffusion plate 25 is formed by performing a molding process for a resin material such as rigid plastic, and as illustrated in FIG. 4, a center circle frame 29B' arranged on the center of the target, twenty linear frames 30' that extend from the center circle frame 29B' in a radial pattern in the diameter direction, and four concentric frames 29D' and 29T' forming two sets are integrally provided to stand on the rear face of a base portion 26a. Thus, similarly to the above-described first partition wall body 24, 82 segments 23' are defined by the center circle frame 29B', the concentric frames 29D' and 29T', and the linear frames 30'. Each of the segments 23' passes through in the back and forth direction and is mounted at a position corresponding to each segment 23 of the first partition wall body 24. Although a member that is acquired by reversing the front and rear faces of the same member as the first partition wall body 24 is used as the second partition wall body 26 in this embodiment, the present invention is not limited thereto, and a member defining segments 23' in shapes approximately the same as those of the segments 23 of the first partition wall body 24 may be used as the second partition wall body 26.

One or more full-color LEDs 27 as one or plural light emitting devices are mounted on the front face of the LED substrate 28 that is arranged on the rear side of the second partition wall body 26 at positions corresponding to the segments 23' of the second partition wall body 26, that is, the positions corresponding to the segment members 31 housed in the segments 23 of the first partition wall body 24. The light emitted from the full-color LEDs 27 enters the diffusion plate 25 without leaking from any one of the segments 23' of the second partition wall body 26, and light that is approximately uniformly diffused by the diffusion plate 25 illuminates the segment members 31 through the sensor sheet 7A. Accordingly, since the emission light can be prevented from taking a roundabout path to adjacent segment members 31 of the first partition wall body 24, the segment members 31 can be irradiated by clearly partitioning the boundary of a predetermined segment 23 to be irradiated.

Figure 8A:
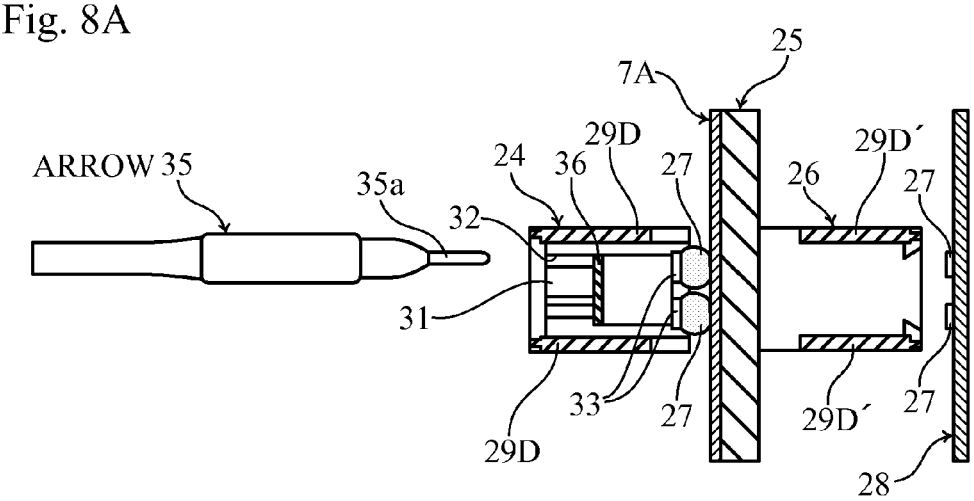
FIGS. 8A to 8C are cross-sectional views of a main portion illustrating an outermost segment of a dartboard.
Figure 8B:
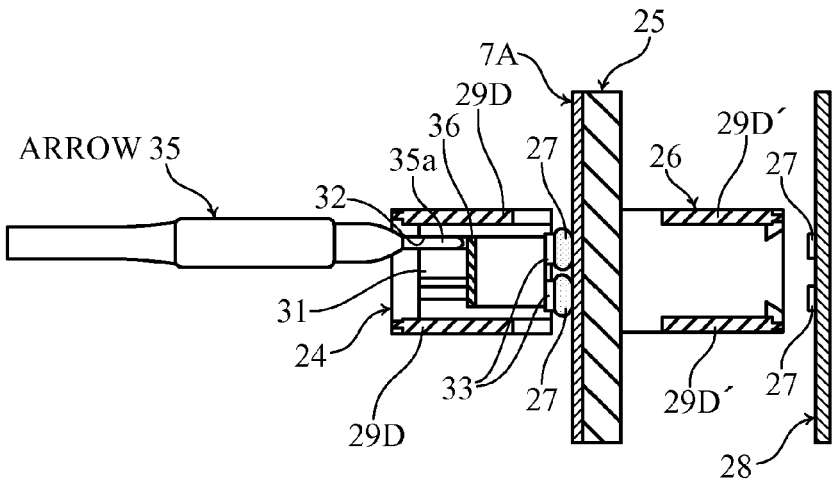
Figure 8C:
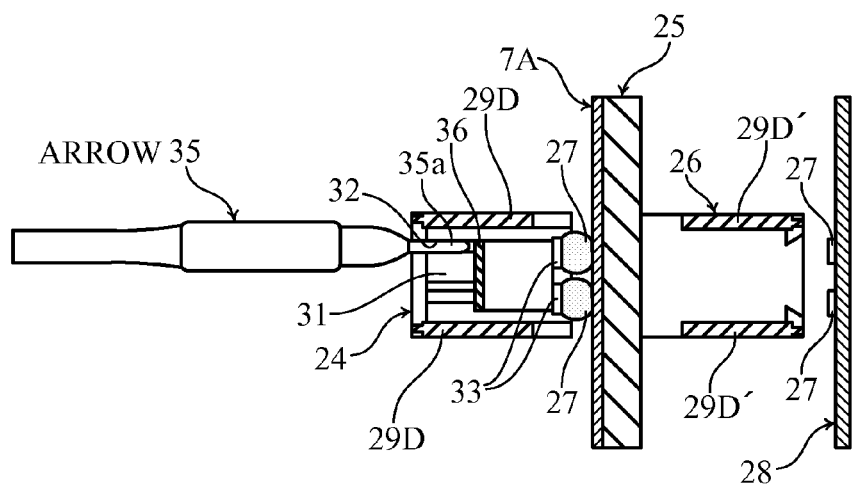

FIGS. 8A to 8C are cross-sectional views of a main portion illustrating an outermost segment of the dartboard 6, and FIG. 8A is a diagram illustrating a state immediately before an arrow 35 hits a segment member 31, FIG. 8B illustrates a state in which the segment member 31 is displaced to the rear side in accordance with an impact force generated by sticking the arrow 35 into the segment member 31, and FIG. 8C illustrates a state in which the segment member 31 is returned to the position of its original point.

As illustrated in FIG. 8A, in the state in which the arrow (soft dart) 35 does not hit the segment member 31, the elastic body 34 attached to the protruded portion 33 on the rear side of the segment member 31 is located at a position at which the stress is not mostly applied to the sensor sheet 7A, and accordingly, a contact point of the membrane switch inside the sensor sheet 7A is not in "ON" state, and a hit detecting signal is not outputted.

On the other hand, as illustrated in FIG. 8B, when the arrow 35 hits the segment member 31, the tip end portion (tip portion) 35a of the arrow 35 is housed in the housing hole 32 of the segment member 31, and the segment member 31 is displaced to the rear side (the right side in FIG. 7A) in accordance with an impact force at the time of hitting, and the elastic body 34 strongly presses the sensor sheet 7A. Accordingly, the contact point of the membrane switch on the sensor sheet 7A is in "ON" state, and the hit detecting signal is outputted from the sensor sheet 7A. When the hit detecting signal is detected, the control section 10 in the electronic dart game device 1 turns on the full-color LEDs 27 on the LED substrate 28 based on the hit detecting signal.

After the contact point of the membrane switch arranged on the sensor sheet 7 is in "ON" state, the segment member 31, as illustrated in FIG. 8C, is returned to the position of its origin point in accordance with the elastic force of the elastic body 34 in the state in which the tip end portion 35a of the arrow 35 is housed in the housing hole 32.

In FIGS. 8A to 8C, a member denoted by reference numeral 36, which is arranged in the end portion of the housing hole 34 of the segment member 31, is a diffusion sheet. If the diffusion sheet 36 is not disposed, the player may not be able to concentrate on a throw when a predetermined segment member 31 is illuminated because a fine wiring pattern and the like of the sensor sheet 7A is slightly visually recognized through the housing hole 32. Thus, by disposing the diffusion sheet 36 in the end portion of the housing hole 32 of the segment member 31, the player cannot visually recognize the above-described wiring pattern and the like, and as a result, the visibility of the dartboard 6 can be improved.

Although not illustrated here, a buffer sheet that is used for buffering the impact force at the time when the arrow 35 is brought into contact with the segment member 31 and the like may be disposed on the front side (the side brought into contact with the elastic body 34) of the sensor sheet 7 in the dartboard 6. In such a case, the vibration generated when the arrow 35 hits the segment member 31 or the like is alleviated, and a malfunction or the like of other membrane switches disposed adjacently thereto can be effectively prevented.

The control of turning-on or -off the full-color LEDs 27 using the control section 10 is not limited only to turning-on or -off the full-color LEDs 27 in correspondence with the segment member 31 hit by the arrow 35, and thus, for example, the segment member 31 to be aimed at by the next throw may be turned-on or blinked in a light emission color (illumination form) that is different from those of the other segments 31. In addition, when the arrow 35 is brought into contact with a segment to be aimed at, a presentation for elevating a player's mood such as blinking all the segment members 31 in multiple colors may be performed.

In this embodiment, although the full-color LEDs 27 having high luminance at low cost are used as the light emitting devices mounted on the LED substrate 28, the present invention is not limited thereto, and, for example, organic EL (electroluminessence) devices, cold cathode fluorescent tubes, liquid crystal panels, miniature lamps or the like may be used as the light emitting devices.

Figure 9:
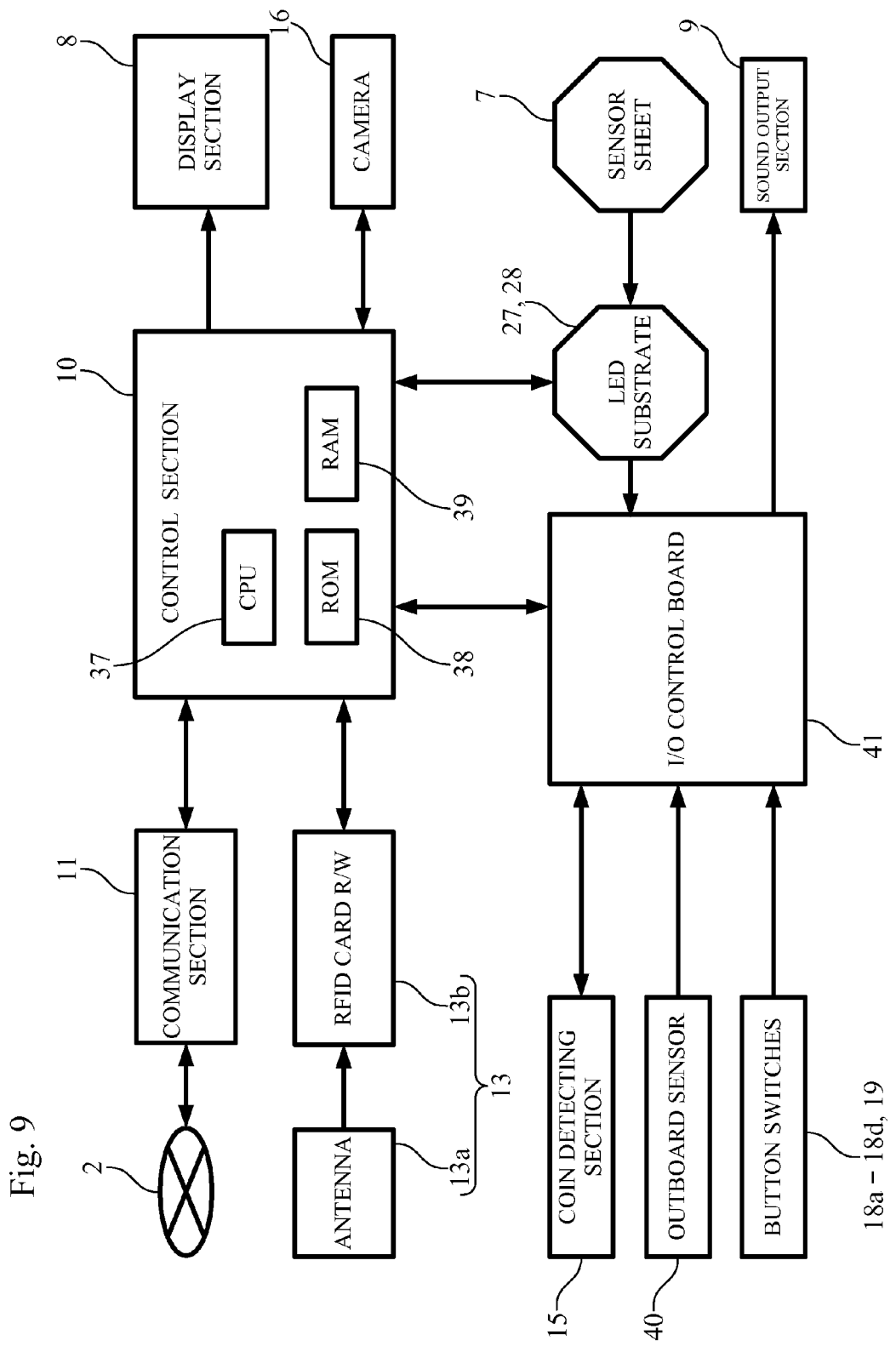
FIG. 9 is a block diagram illustrating a schematic configuration example of a control system of an electronic dart game device of a network game system according to the present invention.

FIG. 9 is a block diagram illustrating a schematic configuration of a control system of the electronic dart game device 1 of a network game system according to the present invention.

In FIG. 9, the control section 10 that is, for example, configured by a general PC (personal computer) or the like at least comprises: a CPU 37 that controls the progress of a game including a presentation and the like during the game, a ROM 38 in which various programs, data tables and the like are stored, and a RAM 39 that serves as a recording area of temporary data and a work area of the CPU 38. The external storage medium processing section 13 that is configured by an antenna 13a, an RFID card reader/writer (RFID CARD R/W) 13b is connected to the control section 10. The CPU 37 in the control section 10 reads out data that is recorded in the external storage medium (ID card) 12 inserted into the card slots 17a to 17d, obtains player-specific data from the server terminal 3 based on the data recorded on the external storage medium 12 by accessing the server terminal 3 from the communication section 11 through the network 2, and performs a process of displaying the data on the display section 8.

Further, devices such as the coin detecting section 15 that detects the coin 14 inserted from the coin inserting opening 21, an outboard sensor 40 that detects the vibration of the dartboard 6 when the thrown arrow 35 does not hit any of the segment members 31, various button switches such as determination buttons 18a to 18d, a selection button 19 and the like, and the sound output section 9 that outputs a sound effect, a warning sound or the like are connected to the control section 10 through an I/O control board 41.

Furthermore, the LED substrate 28 on which the full-color LEDs 27 are mounted, and a camera 16 that photographs a still image or a moving image of the player throwing the arrow 35 from the throwing line are connected to the control section 10. The sensor sheet 7A on which the membrane switch as the hit detecting section 7 is mounted is connected to the LED substrate 28, and the hit detecting signal detected by the sensor sheet 7A is outputted to the control section 10 through the LED substrate 28.

Figure 10:
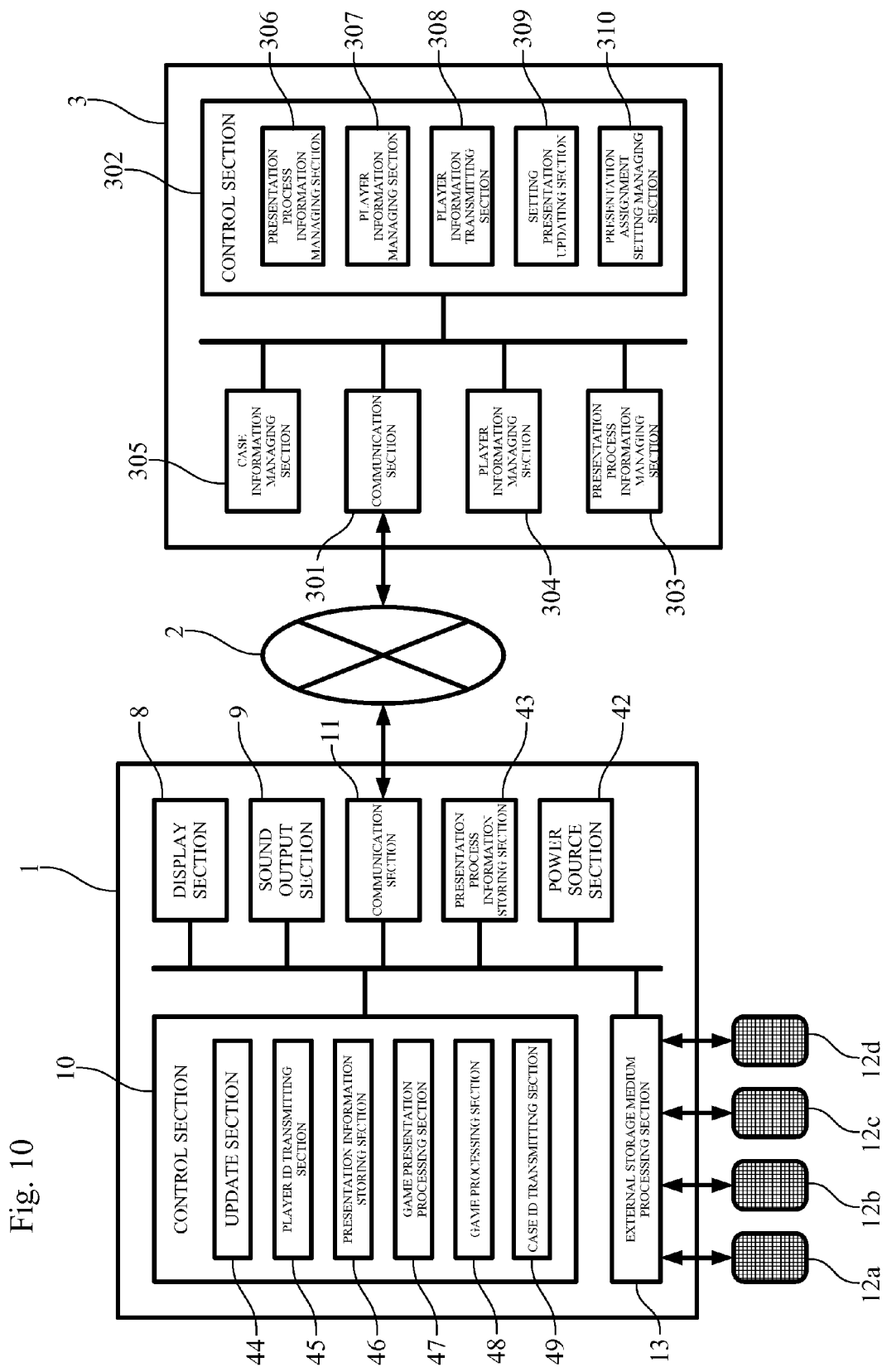
FIG. 10 is a block diagram schematically illustrating a configuration example of a network game system according to the present invention.

FIG. 10 is a block diagram schematically illustrating an example of the configuration of the network game system according to the present invention. As illustrated in FIG. 10, the dart game device 1 and the server terminal 3 are interconnected so as to enable transmission or reception of data/information through the network 2 connected to the communication section 11 and a communication section 301.

In addition to the communication section 11, the dart game device 1 comprises: the control section 10 that has the CPU 37 and storage areas such as the ROM 38, the RAM 39 and the like as described above; the display section 8 and the sound output section 9 whose output is controlled on the basis of a control signal outputted from the control section 10; the external storage medium processing section 13 that can readout the player ID, which is unique to the player, at least stored in the storage area of each of external storage media (ID cards) 12a to 12d; a power source section 42 that outputs a power input signal to the control section 10 when the power is inputted to the game device 1; and a presentation process information storing section 43 in which various types of data (a background image graphic, an effect animation, an effect sound, a texture, and the like) that are referred to when a game presentation having decorativeness higher than that of an ordinary game presentation is performed during a game performed by the game device 1.

On the other hand, the server terminal 3 has a CPU and storage areas such as a ROM, a RAM and the like in addition to the communication section 301 and comprises: a control section 302 that performs an overall control of the network game system; a presentation process information managing section 303 in which various types of presentation process information, permission for copy of the presentation process information and the like are stored in association with a game presentation ID; a player information managing section 304 in which a player information including a player name of a player owning the external storage media 12a to 12d, a game history such as a game win/loss history and a rating (score), a game presentation ID of a presentation process information that is set to be used in each of the storage media 12a to 12d (hereinafter, referred to as a used game presentation ID), and a game presentation ID of the presentation process information (hereinafter, referred to as an acquired game presentation ID) for which use permission is set in each of the external storage media 12a to 12d, and the like is stored in association with a player ID; and a case information managing section 305 in which presentation assignment setting information enabling the game device 1 to assign a predetermined presentation process information to the external storage media 12a to 12d is stored in association with a case ID assigned to each game device 1. Here, the used game presentation ID included in the player information of the player information managing section 304 corresponds to the presentation process information of a game presentation performed during a game when the game is performed by using the external storage media 12a to 12d, and the obtained game presentation ID is in a state in which a game presentation on the basis of the presentation process information associated with the game presentation ID can be used in the external storage media 12a to 12d (for example, a state in which the game presentation ID can be set as the used game presentation ID by accessing the server terminal 3 from the PC 4, the cellular phone 5 and the like through the network 2).

The presentation process information storing section 43 included in the game device 1 and the presentation process information managing section 303, the player information managing section 304 and the case information managing section 305 that are included in the server terminal 3 are allotted to areas inside the storage areas of the storage devices such as installed hard disk drives (HDD).

The presentation process information that is stored in the presentation process information storing section 43 in the dart game device 1, the presentation process information managing section 303 in the server terminal 3 and the like is data for performing a game presentation of various aspects in accordance with each piece of the game presentation information. Here, the game presentation information is information (data) relating to a presentation process allowing a game to have more appealing power with auxiliary effects that appeal to five senses including a visual sense, an auditory sense and the like of the player using a background image, an image of a costume or the like of a character, motion data of a character, BGM, an effect sound and the like. Examples of such a presentation process includes: changing the background image of a throw-time screen of the display section 8, which is displayed when the player throws the arrow, to an image (for example, an animal image, a landscape image or the like) that is more decorative than a normal background image; outputting an effect sound or the like from the sound output section 9, which is more decorative than a normal sound, when the arrow 35 hits the dartboard 6; turning-on or blinking the full-color LEDs 27 mounted on the LED substrate 28 in a decorative manner, and the like, in the dart game, for example, performed by the above-described dart game device 1.

The control section 10 in the dart game device 1 comprises an update section 44, a player ID transmitting section 45, a presentation information storing section 46, a game presentation processing section 47, a game processing section 48, and a case ID transmitting section 49. The control section 302 in the server terminal 3 comprises a presentation process information managing section 306, a player information managing section 307, a player information transmitting section 308, a setting presentation updating section 309, and a presentation assignment setting managing section 310. In the network game system according to this embodiment, the control process performed by the above-described processing sections is realized as control programs stored in the storage areas of the game device 1 and the server terminal 3 that are communicably interconnected through the network 2 are performed by the control sections 10 and 302 thereof in a cooperative manner. The present invention is not limited thereto, and, for example, the control process performed by the above-described processing sections may be realized by loading a game control program recorded in a DVD/CD-ROM or the like in a recording area (the RAM 39 or the like) through a reading device installed in the game device 1 and processing the game control program loaded in the storage area and various types of data by using the control section 10.

When the power is supplied to the power source section 42, the update section 44 communicates with the server terminal 3, compares the presentation process information stored in the presentation process information storing section 43 with the presentation process information stored in the presentation process information managing section 303, and performs a process of updating various types of data of the presentation process information in the presentation process information storing section 43 when there is the presentation process information, which has not been stored in the presentation process information storing section 43, out of the presentation process information stored in the presentation process information managing section 303. In addition, the update section 44 can perform a process of performing the latest software updates or updating additional game information or the like through the above-described process.

When the external storage media 12a to 12d are inserted into the card slots 17a to 17b, the player ID transmitting section 45 reads out the player IDs from the external storage media 12a to 12d through the external storage medium processing section 13 and transmits the player IDs from the communication section 11 to the server terminal 3.

The presentation process information storing section 46 stores the presentation process information updated by the update section 44 or the like in the presentation process information storing section 43 in association with the game presentation ID. The presentation process information stored in the presentation process information storing section 43 by the presentation process information storing section 46 maybe information that is read out from the external storage media 12a to 12d or a storage medium such as a DVD/CD-ROM.

The game presentation processing section 47 reads out presentation process information associated with a used game presentation ID from the presentation process information storing section 43 in accordance with the used game presentation ID of the player ID transmitted from the server terminal 3 and performs the above-described presentation process.

The game processing section 48 performs a game starting process in which a game is started so as to advance in accordance with an input operation (for example, an input through the button switches 18a to 18d and 19, or an input according to hitting the dartboard 6 with the arrow 35) of the player and performs a game ending process in which information such as a game result is transmitted in association with the player ID to the server terminal 3 when the game ends.

The case ID transmitting section 49 transmits a unique case ID that is assigned to each of the game devices 1, 1A, 1B, . . . from the communication section 11 to the server terminal 3, for example, when the communication is performed by the above-described update section 44.

The presentation process information managing section 306 stores plural sets of the presentation process information that is processed for a presentation by the game presentation processing section 47 in the presentation information managing section 303 in association with the game presentation IDs when the game is performed on the game device 1. The presentation process information that is stored in the presentation information managing section 303 is occasionally added, for example, by an administrator of the server terminal 3 or anyone else and is stored in association with the game presentation ID by the presentation process information managing section 306 on all such occasions.

The player information managing section 307 stores the player information that includes the used game presentation IDs, the acquired game presentation IDs, a player name, a game win/loss history, a rating, and the like of the external storage media 12a to 12d in the player information managing section 304 in association with a player ID based on the player ID transmitted from the game device 1.

When the player ID is received from the dart game device 1, the player information managing section 308 reads out the game presentation ID set to the player ID from the player information managing section 304 and transmits the game presentation ID from the communication section 301 to the dart game device 1.

The setting presentation updating section 309 updates the information on the acquired game presentation ID of the player ID that is stored in the player information managing section 304 and transmits the updated result to the game device 1 or the communication terminal such as the PC 4 or the cellular phone 5 that is owned by the player. A condition for updating the information on the acquired game presentation ID associated with each of the external storage media 12a to 12d will be described later in detail. The dart game device 1 that has received the updated result notifies the player of a change (for example, a new game presentation ID is set as the acquired game presentation ID) in the information on the acquired game presentation ID set in the external storage media 12a to 12d by outputting a screen indicating acquisition of the presentation process information on the display section 8.

The presentation assignment setting managing section 310 stores, the presentation assignment setting information, which enables the game device 1 to assign a predetermined game presentation information to the external storage media 12a to 12d, in the case information managing section 305 in association with the case ID transmitted from the dart game device 1. The presentation assignment setting information of each case ID can be appropriately changed, for example, by an administrator of the server terminal 3 or anyone else.

In the network game system according to this embodiment, although the configuration is employed in which predetermined game presentation information is assigned to the external storage medium in association with the case ID, a store ID (store identification information) that is set to each store at which the case (game device 1) is installed, a region ID (region identification information) that is set for each region in which the game device 1 is installed, or the like may be arranged in association with the case ID. By employing such a configuration in which the store ID is arranged, the same game presentation information can be assigned to all the cases (game devices 1, 1A, 1B, . . . ) that are installed to a specific store, and accordingly, the store ID can be used for operating an event at the store or the like. In addition, by employing a configuration in which the region ID is arranged, the game presentation information that is assigned only in case where the game is played by using the case installed in a region can be set by limiting the region (for example, prefectures or municipalities) to which installed stores belong, and accordingly, an event limited to a specific region (for example, game presentation information assigning event limited to Tokyo, game presentation information assigning event limited to Kanto region, or the like) can be operated.

In addition, when at least one in-store server that manages the cases (game devices) disposed inside the store is included as the configuration, a configuration can be employed in which presentation process information is assigned to each case (the game devices 1, 1A, 1B, . . . ) through the in-store server based on a store ID that is set to the in-store server without managing case IDs in the server terminal 3. Concretely, the in-store server having the store ID information transmits the store ID to the server terminal by employing the same configuration as that of the above-described game device 1, the server terminal 3 that has received the information transmits game presentation information associated with the store ID to the in-store server, and the in-store server that has received the game presentation information transmits the game presentation information to the cases associated with the managed case ID. As described above, by managing the cases set up within the store as a whole by using the in-store server terminal, the information can be selected and managed by using the store ID without managing all the case IDs by using the server terminal 3, and accordingly, the process load is reduced.

Figure 11:
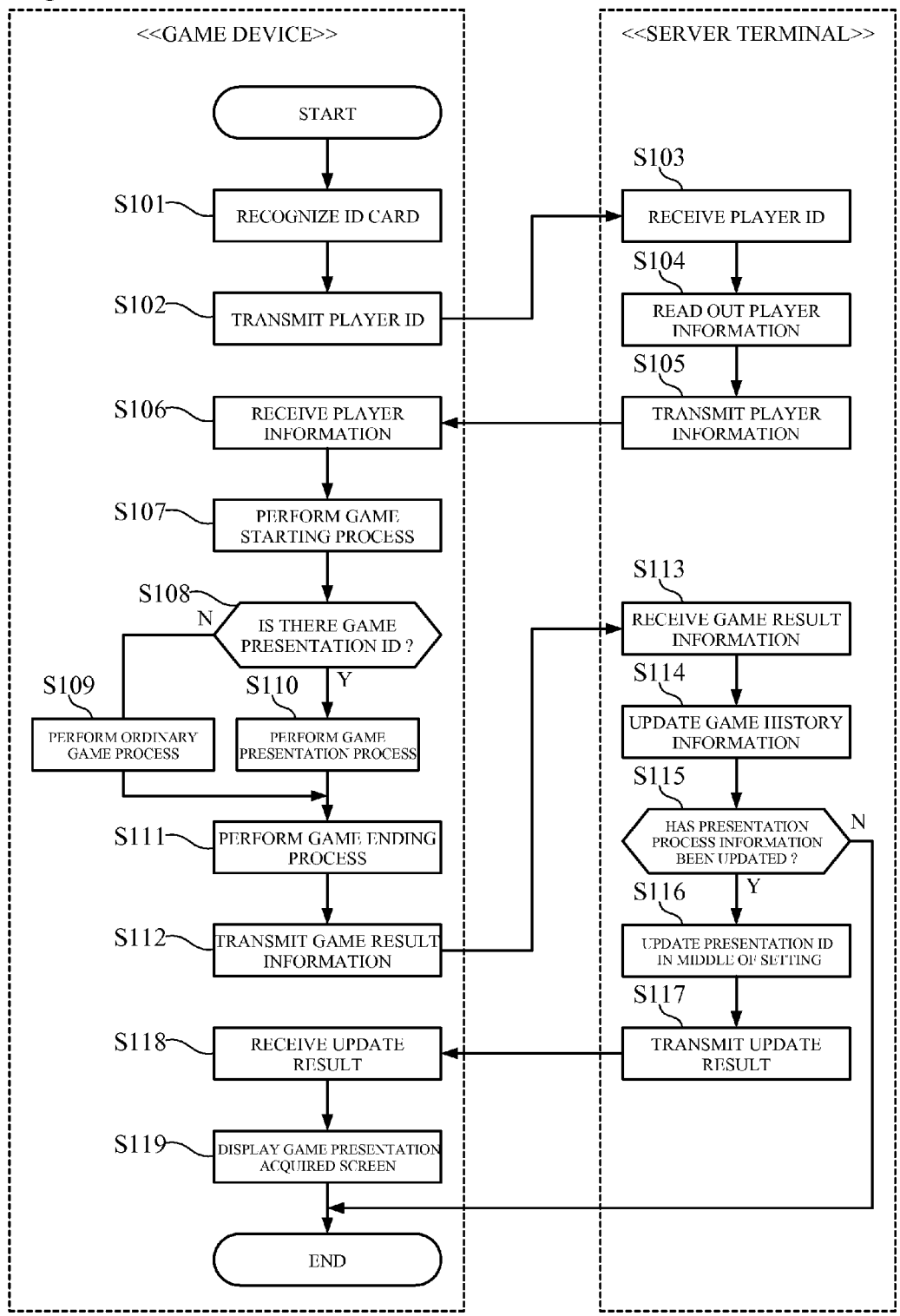
FIG. 11 is a flowchart illustrating a processing operation example of a network game system according to the present invention.

FIG. 11 is a flowchart illustrating a processing operation example of a network game system according to the present invention. The network game process described below is started at a time point when the external storage media 12a to 12d are inserted into the card slots 17a to 17d, and an input of determination of a game mode (Zero-One, Cricket, Count-Up, or the like) that is performed through the button switches 18a to 18d and 19 is performed in the above-described electronic dart game device 1.

In FIG. 11, when the network game process is started, first, a player ID that is stored in the external storage media 12a to 12d is read out through the external storage medium processing section 13 of the game device 1 (Step S101), and the player ID recognized here is transmitted from the communication section 11 to the server terminal 3 through the network 2 (Step S102).

When the player ID transmitted from the game device 1 is received by the server terminal 3 through the communication section 301 (Step S103), the player information including the used game presentation ID, the acquired game presentation ID, the player name, the game win/loss history, the rating, and the like that are set to the player ID is read out from the player information managing section 304 (Step S104), and the player information associated with the player ID is transmitted from the communication section 301 to the game device 1 through the network 2 (Step S105).

When the player information transmitted from the server terminal 3 is received by the game device 1 through the communication section 11 (Step S106), a game starting process in which a game advances by starting a selected game mode is performed (Step S107), and it is determined whether there is the used game presentation ID in the received player information (Step S108). Here, when there is no used game presentation ID, an ordinary (default) game presentation process is performed based on the game control program (Step S109). On the other hand, when there is the used game presentation ID, presentation process information associated with the used game presentation ID is read out from the presentation process information storing section 43, and a game presentation process that is different from the ordinary game presentation process is performed (Step S110). Thereafter, when the selected game mode is completed, and the game ending process is performed (Step S111), a game result information associated with the player ID is transmitted from the communication section 11 to the server terminal 3 through the network 2 (Step S112).

At the above Step S108, although it is used as a determination factor whether there is the used game presentation ID in the received player information, the present invention is not limited thereto, and, for example, a configuration may be employed in which the game presentation ID is associated with the presentation process information used for performing an ordinary game presentation, and the process at the Step S109 is performed when the used game presentation ID that is set in the player information is the ordinary game presentation ID. Here, the ordinary game presentation process is a presentation process information that is set as an initial value (default) in the game control program.

For example, in the dart game device 1 that can change a background image as a game presentation process, a game presentation process information is read out for each player at the above Step S110, and when each player plays a game in turns, a play screen having an image associated with the used game presentation ID read out for each player as a background image is displayed on the display section 8. On the other hand, when there no used game presentation ID at the Step S108, a play screen having an ordinary image set as an initial value (default) in advance in the game control program as a background image is displayed on the display section 8. As described above, this game presentation process is not limited to the background image information of a play screen, and for audio information such as BGM or an effect sound during a play or the like, different data for each player can be outputted by using the same configuration. In turns of the players, the game advances with different game presentation data desired by each player being outputted. As a result, a dart game device with greater attraction is realized.

When the game result information transmitted form the game device 1 is received by the server terminal 3 through the communication section 301 (Step S113), the game history information of each player ID stored in the player information managing section 304 is updated based on the game result information (Step S114), and it is determined whether or not the information on the acquired game presentation ID is updated (Step S115). The update of the information on the acquired game presentation ID, for example, is adding the game presentation ID to an acquired game presentation ID table that is stored in the player information managing section 304 inside the server terminal 3 so as to be set as the acquired game presentation ID, such that the game presentation ID of predetermined presentation process information on the basis of the presentation assignment setting information associated with the case ID of the game device 1 is in a usable state, or such that a used game presentation ID set in the external storage medium 12 of another player participating in the same game is in a usable state.

When the information on the acquired game presentation ID of the external storage media 12*a* to 12*d* is determined to be updated at the above Step S115, the information on the acquired game presentation ID of the player ID that is stored in the player information managing section 304 is updated (Step S116), and the updated result of the information on the acquired game presentation ID is transmitted from the communication section 301 to the game device 1 through the network 2 (Step S117). Then, when the updated result of the information on the acquired game presentation ID that is transmitted from the server terminal 3 is received by the game device 1 through the communication section 11 (Step S118), a screen that indicating the acquisition of the presentation process information of the game presentation associated with the acquired game presentation ID is displayed on the display section 8 (Step S119), and the network game process ends. On the other hand, when the information on the acquired game presentation ID of the external storage media 12*a* to 12*d* is determined not to be updated at the Step S115, the network game process ends without performing the process of the Steps S116 to S119.

In the network game process according to this embodiment, by associating the presentation assignment setting information used for allowing the game presentation ID of the specific presentation processing information to be in a usable state with the case ID of a specific game device, a strong motivation for a player to play a game by using the specific game device for acquiring a new game presentation is provided. Further, the game presentation of the used game presentation ID (the acquired game presentation ID) that is set to be used (or set for use permission) on the server terminal 3 for the player ID of the external storage medium 12 owned by the player participating in the same game can be in a state being able to be used by other players, and accordingly, a willingness to play a game between players can be stimulated.

In order to set the presentation process information newly acquired at the above Step S119 as the game presentation of the external storage medium 12 used during the play, each player owning the external storage medium 12 can change the game presentation ID associated with the presentation process information from the acquired game presentation ID to the used game presentation ID by accessing the server terminal 3 from the communication terminals (4, 5 or the like) through the network 2, as described above.

Figure 12:
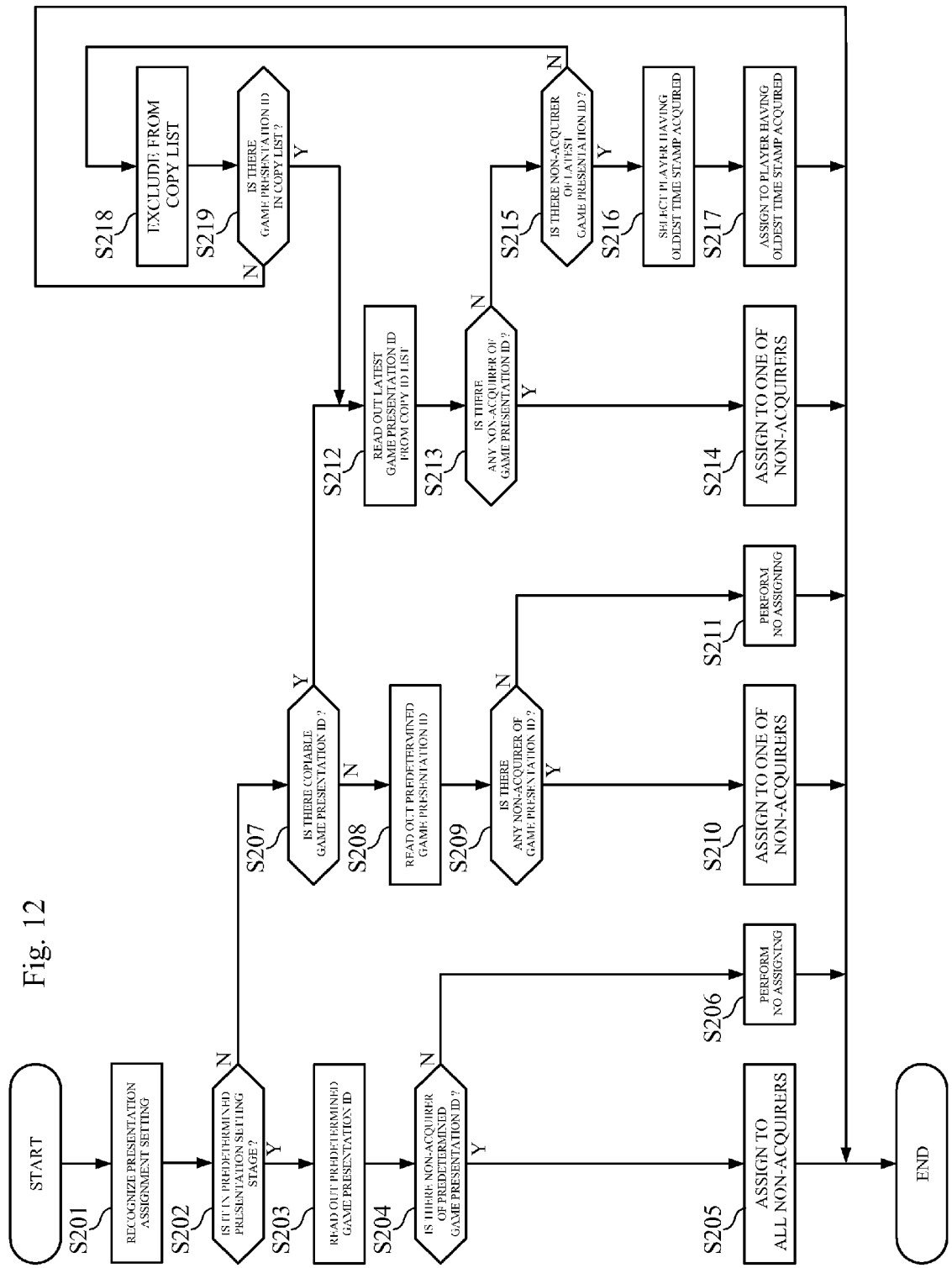
FIG. 12 is a flowchart illustrating the determination example of a player who updates game presentation ID in a network game system according to the present invention.

FIG. 12 is a flowchart illustrating the determination example of the player who updates the game presentation ID in the network game system according to the present invention. It is assumed that an update process for the game presentation ID described below is started at a time point when the selected game mode is completed for the above-described electronic dart game device 1, and the game result information associated with the player ID is transmitted from the game device 1 to the server terminal 3 through the network 2.

In FIG. 12, when a process of determining the player of which the game presentation ID is updated is started, first, the presentation assignment setting information associated with the case ID of the game device 1 is read out from the case information managing section 305 (Step S201), and it is determined whether it is in a predetermined presentation setting stage in which the game device 1 can assign the predetermined presentation process information (Step S202).

When it is determined to be in the predetermined presentation setting stage in which the game device 1 can assign the predetermined presentation process information (Step S202), the predetermined game presentation ID associated with the predetermined presentation assignment setting information is read out as the game presentation to be assigned (Step S203). Then, the player information stored in the player information managing section 304 is referred to, and it is determined whether there is any person who is a non-acquirer of the predetermined game presentation ID (Step S204). Here, an acquirer is a person who has the external storage medium 12 in a state in which the game presentation ID of the presentation process information is set as the acquired game presentation ID to be usable for the player information associated with the player ID, as described above. When it is determined that there is a person who is a non-acquirer of the predetermined game presentation ID, the predetermined game presentation is assigned to all the persons who are not the acquirers, and the game presentation ID is added in the acquired game presentation ID table included in the player information of all the assigned player IDs stored in the player information managing section 304 (Step S205), and the update process of the game presentation ID ends. On the other hand, when it is determined that there is no person who is a non-acquirer of the predetermined game presentation ID at the above Step S204, the game presentation is not assigned to any player (Step S206), and the update process of the game presentation ID ends.

A player who has the player ID to which the predetermined game presentation ID is assigned in the process at the above Step S205 can perform the game presentation process corresponding to the game presentation ID at the next play by accessing the server terminal 3 from the communication terminal such as the PC 4 or the cellular phone 5 through the network 2 after the end of the game and setting the newly assigned game presentation ID (the acquired game presentation ID) as the used game presentation ID. At the above Step S205, although the predetermined game presentation has been described to be assigned to all the persons who are not the acquirers, the rule of the assignment is merely an example, and, for example, the predetermined game presentation may be assigned to any one of the persons who are not the acquirers or some of the persons who are not the acquirers through a determination section to be described later.

On the other hand, when it is determined not to be in the predetermined presentation setting stage at the Step S202, the information of the game presentation ID that is set as the used game presentation ID for the player ID of the external storage media 12*a* to 12*d* is referred to by referring to the player information stored in the player information managing section 304. In each game presentation ID, information, in which whether copy between players is permitted is set, is included, and here, it is determined whether there is any game presentation ID that is permitted to be copied between the players in the used game presentation ID set for the player ID of each of the external storage media 12*a* to 12*d* (Step S207). The copy between the players, as described above, is adding the game presentation ID that is set to be used (or set for use permission) on the server terminal 3 for the player ID of the external storage medium 12 owned by a specific player in the acquired game presentation ID table (the player information that is stored in the player information managing section 304 in association with the player ID) of other players participating in the same game as the game of the player and setting the game presentation ID as the acquired game presentation ID.

When it is determined that there is no game presentation ID that can be copied at the Step S207, a basic game presentation ID is read out as the game presentation to be assigned (Step S208), and it is determined whether there is any person, who is non-acquirer, having no game presentation ID set as the acquired game presentation ID (Step S209). When it is determined that there is a person, who is non-acquirer, not acquiring any game presentation ID, the basic game presentation read out at the Step S208 is assigned to one of the acquirers who is arbitrarily selected (for example, a person is selected with priority in the order of the number of the card slots 17*a* to 17*d* into which the external storage media 12*a* to 12*d* are inserted), the information on the acquired game presentation ID of the assigned player ID that is stored in the player information managing section 304 is updated (Step S210), and the update process of the game presentation ID ends. On the other hand, when it is determined that there is no person at the Step S209, who is non-acquirer, not acquiring any game presentation ID, the game presentation is assigned to no player (Step S211), and the update process of the game presentation ID ends.

The basic game presentation ID is a game presentation ID that is assigned when there is no person who sets the game presentation ID that can be copied, as described above. Generally in a dart game or the like, although a high-level player tends to be reluctant to playing with a novice player, a game playing of a novice player with a high-level player leads to improvement of skills. Accordingly, by promoting a game play between the novice player and the high-level player, the novice player reaches skills of a higher level so as to generate motivation for playing the game again, and as a result, the repetition rate of the game play can be increased.

In this embodiment, there is a high possibility that a person, who is non-acquirer, not acquiring any game presentation ID is a novice player having a short period of experiences in the game. Therefore, there is a situation in which a novice player has the basic game presentation ID with a high possibility. Thus, in order to obtain the basic game presentation that cannot be easily obtained, a high-level player aggressively plays a game with a novice player, and accordingly, a game play between the high-level player and the novice player can be promoted, and therefore, the above-described advantages can be obtained. In addition, the presentation process information of each game presentation can be changed by an administrator through the presentation process information managing section 306, and as the administrator updates the basic game presentation ID to a new game presentation for every predetermined period, the above-described advantages can be maintained.

When there are game presentation IDs, which can be copied, set to the player ID of the external storage media 12*a* to 12*d* as the used game presentation IDs at the Step S207, the game presentation IDs that can be copied are formed as a list (for example, refer to FIG. 13 to be described later). This list is configured by information of a name of each game presentation, a player name in which each game presentation is set to be used, date and time (an acquisition time stamp) when the player set to use each game presentation acquires each game presentation, a player name in which each game presentation has acquired, date and time (a distribution time stamp) when the game presentation corresponding to each game presentation ID can be distributed. From this list, latest presentation process information having a latest acquisition time stamp is read out, and the latest game presentation ID associated with the latest presentation process information is read out as the game presentation ID to be assigned (Step S212). Then, it is determined whether or not there is a person, who is non-acquirer, for whom any game presentation ID is not set as the acquired game presentation ID by referring to the player information stored in the player information managing section 304 (Step S213). When it is determined that there are persons, who are non-acquirers, not acquiring any game presentation ID, the latest game presentation is assigned to the external storage medium 12 of one person who is arbitrarily selected from the persons who are not acquirers, the information on the acquired game presentation ID of the assigned player ID that is stored in the player information managing section 304 is updated (Step S214), and the update process of the game presentation ID ends. Further, when the new acquired game presentation ID is acquired at the Step S214 or the like, the player information may be updated with the newly acquired game presentation ID as the used game presentation ID. In particularly, when the game presentation ID is assigned to a person, who is non-acquirer, not acquiring any game presentation ID in the past, it may be configured such that the player does not set the used game presentation ID by using the communication terminal (4, 5) though the network 2, but the control section 302 in the server terminal 3 updates the used game presentation ID, whereby the number of players for whom the game presentation process is not set can be decreased.

When it is determined that there is no person who is a non-acquirer of the game presentation ID at the Step S213, it is determined whether there is a person who is not acquirer of the latest game presentation ID selected from the list of the game presentation IDs that can be copied by referring to the player information stored in the player information managing section 304 (Step S215). Here, when it is determined that there is a person who is a non-acquirer of the latest game presentation ID, the acquisition time stamp of the used game presentation ID set to the person who is a non-acquirer of the latest game presentation ID is referred to from the player information managing section 304, and the player to whom the used game presentation ID having the oldest acquisition time stamp among them is set is selected as a copy destination (Step S216). Then, the latest game presentation is assigned to the selected player, the information on the acquired game presentation ID of the assigned player ID that is stored in the player information managing section 304 is updated (Step S217), and the update process of the game presentation ID ends.

When it is determined that there is no person who is a non-acquirer of the latest game presentation ID at the above Step S215, the latest game presentation ID is excluded from the list of game presentation IDs that can be copied (Step S218), and it is determined whether or not the game presentation ID is still included in the list of game presentation IDs that can be copied (Step S219). Here, when it is determined that the game presentation ID is included in the list of game presentation IDs that can be copied, the process proceeds to the Step S212, the latest presentation process information (that is, the second latest presentation process information) having the latest acquisition time stamp is selected from the remaining game presentation IDs included in the list of game presentation IDs that can be copied, and the process from the Step S213 and after that is performed. On the other hand, when it is determined that the game presentation ID is not included in the list of game presentation IDs that can be copied at the Step S219, the game presentation is not assigned to any player, and the update process of the game presentation ID ends.

FIG. 13 is a table illustrating a list of game presentation IDs that can be copied in the process of a network game system according to an embodiment of the present invention. Although the copying of game presentation IDS of the external storage media 12a to 12d of four players participating in a game of the game device 1 is described in the table, the present invention is not limited thereto, and, for example, the external storage media 12 of players participating in the game through other game devices 1A, 1B, ... connected through the network 2 maybe added to the copy targets of the game presentation IDs.

As described above, in the update process of the game presentation IDs according to this embodiment, a configuration is employed in which the presentation process information having the latest acquisition time stamp is selected with priority by comparing the acquisition time stamps. Accordingly, a newer game presentation is copied more, and therefore player's feeling of desiring to acquire a newest game presentation acquired by other players can be responded.

In addition, the configuration is employed in which the game presentation to be copied is copied with priority for a person, who is non-acquirer, to whom no game presentation is set to be permitted for use and is copied with priority to a player who sets the oldest game presentation among them to be used when there is no person who is non-acquirer. Accordingly, more players can enjoy more types of the game presentations.

The above-described comparison determination factor is merely an example, and thus an administrator or a manager may select the game presentation of the copy source or the player of the copy destination by setting another criterion as the determination reference. As the determination reference used for selecting the game presentation to be copied, for example, information of a distribution time stamp that represents the date and time when each game presentation is started to be distributed, the number of acquired players that represents the number of players acquiring each game presentation out of all the players registered in the server terminal 3, the number of set players that represents the number of players, who set each game presentation as the used game presentation ID, out of all the players, the degree of priority that represents the priority level for copying for each game presentation, the number of copy generations, or the like can be used.

When the determination is made by using the distribution time stamp, a configuration is formed in which a game presentation having a newer or older distribution date is copied with higher priority. When the determination is made by using the number of players who have acquired each game presentation, a configuration is formed in which a game presentation that is distributed the most or the least is copied with highest priority. In particular, generally, a fewer number of the acquirers represents a higher added value, and accordingly, by setting a game presentation having a higher added value to be copied with higher priority, a configuration can be realized in which a game presentation desired by the player is copied. In contrast, by setting a game presentation having a higher added value to be less easily copied, the distribution thereof is more limited, and the added value can be further increased.

Further, when the degree of priority is set as the determination reference, by changing the value of priority, the priority level of copying can be easily changed. Accordingly, it is possible to easily reflect an administrator's intention on the priority level of copying of each game presentation.

In addition, the number of generations of a copy can be used as the determination reference. The number of generations of a copy is data information that is, for example, defined as the first generation for a player who acquires a corresponding game presentation first and has the number representing the generation of a copy added by one thereafter each time the game presentation is copied between players. By configuring a game presentation having a less value of the generations of a copy to be copied with higher priority, a configuration can be realized in which a newer theme is assigned. By setting the difference between a game presentation ID of the player that is acquired by actual participation to an event or the like and the player ID acquired through copying by playing a game with the player such as the above-described data parameter, strong motivation for player's participation to an event can be arranged.

As in examples described above, by arranging various determination reference, the administrator can adjust the amount of distribution of each game presentation and the like to a desired state.

In FIG. 13, different game presentation IDs « 1 » to « 4 » are set as the used game presentation IDs to the players IDs [a] to [d] corresponding to the external storage media 12a to 12d, and the game presentation IDs « 1 » to « 4 » are sorted in the order of newer time stamps at which the game presentation IDs are acquired. As the types of the game presentation corresponding to the game presentation IDs, the game presentation ID « 1 » is a presentation process information used for composing a background image of "clouds" and outputting the background image to a display screen at the time of throwing an arrow in a dart game, the game presentation ID « 2 » is a presentation process information used for composing a background image of "flames" and outputting the background image to the display screen at the time of throwing the arrow in the dart game, and the game presentation ID « 3 » is a presentation process information used for composing a background image of "starts" and outputting the background image to the display screen at the time of throwing the arrow in the dart game, and the game presentation ID « 4 » is a presentation process information used for composing a background image of "fish" and outputting the background image to the display screen at the time of throwing the arrow in the dart game.

At the Step S207 in FIG. 12, when it is determined that there is a copiable game presentation ID out of the game presentation IDs set as the used game presentation IDs to the player IDs of the external storage media 12a to 12d, the list of copiable game presentation IDs illustrated in FIG. 13 is referred to. Then, first, when the list is sorted, the presentation ID disposed at the top is referred to, in other words, the game presentation ID « 2 » that has the newest acquisition time stamp from the list is read out as a game presentation (the latest game presentation ID) to be copied, and the acquisition states of the corresponding game presentation for each user (whether or not it becomes the acquired game presentation ID) are checked. In the figure, a mark "o" represents that another player ID has already acquired the corresponding game presentation, and a mark "x" represents that the corresponding game presentation is not acquired by other player IDs.

Although the game presentation ID « 2 » that is set to be used in the player ID [c] has the newest acquisition time stamp, other player IDs [a], [b] and [d] are in the state of already acquiring the game presentation ID « 2 », and accordingly, the game presentation ID « 2 » is excluded from a selection list of game presentation IDs to be copied. Thereafter, next, the game presentation ID « 4 » having the next newest acquisition time stamp is read out as the game presentation (the latest game presentation ID) to be copied, and the acquisition states of the corresponding game presentation for each player are checked.

The game presentation ID « 4 », which is used in the player ID [a], has not been acquired yet by two players corresponding to the player IDs [b] and [c]. Accordingly, the acquisition time stamps of the player IDs [b] and [c] are compared who are not acquirers yet, and the player [b] having the oldest acquisition time stamp is selected as a player who acquires the game presentation ID « 4 ». Then, the information on the acquired game presentation of the player ID [b], which is stored in the player information managing section 304, is updated, and the game presentation ID « 2 » is added in the acquired game presentation ID table.

Figure 14A:
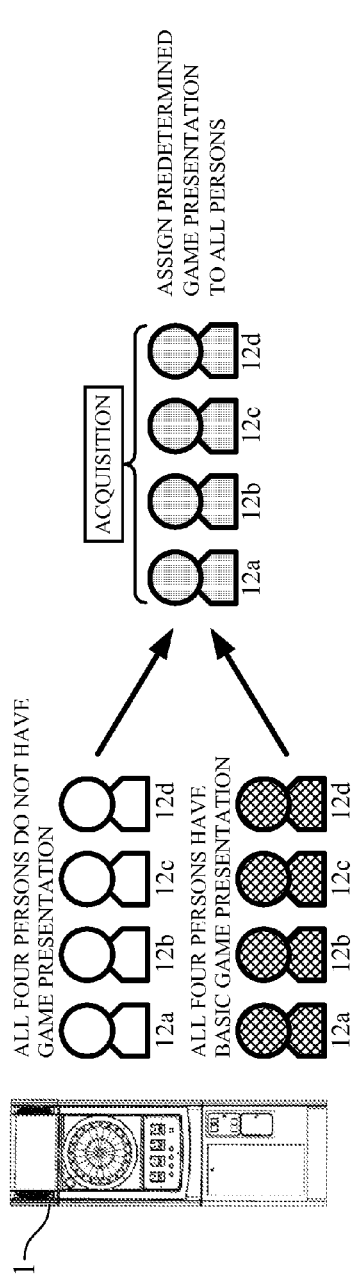
FIGS. 14A and 14B are explanatory diagrams illustrating an example of assigning and copying presentation process information in the process of a network game system according to the present invention.
Figure 14B:
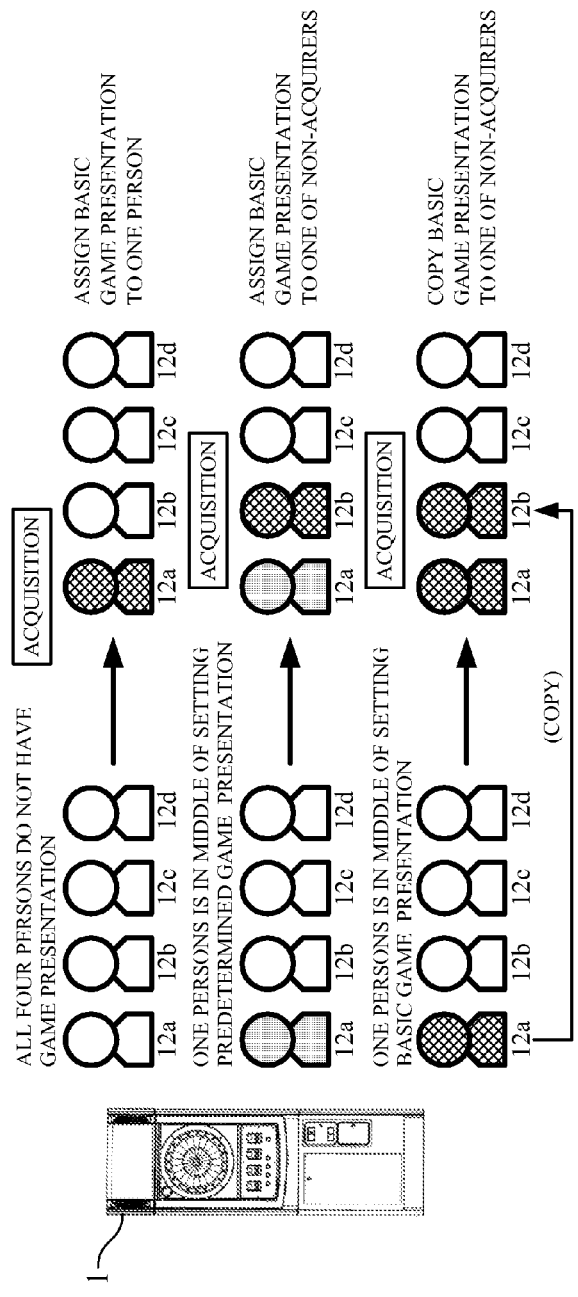

FIGS. 14A and 14B are explanatory diagrams illustrating assigning and copying presentation process information in the process of the network game system according to an embodiment of the present invention. In the network game system according to an embodiment of the present invention, when being broadly divided, there are two types of the presentation process information for which different regulations for a copy are set. One type of the presentation process information is the predetermined game presentation process information that is assigned at the Step S205 in FIG. 12, and the predetermined game presentation process information is set so as not to be copied to other players. The other type is the basic game presentation process information that is assigned at the Steps S210, S214, S217 in FIG. 12, and this basic game presentation process information is set so as to be copiable to only one of other players participating in the game. The copy permission setting information is included in the data of the game presentation ID.

FIG. 14A is an explanatory diagram of a copying operation when the game device 1 is in a predetermined presentation setting stage in which the game device 1 can assign a predetermined game presentation process information. In this predetermined presentation setting stage, when no game presentation is assigned to the external storage media 12a to 12d of all the players participating in the game or when any basic game presentation is assigned to the external storage media 12a to 12d of all the players, the predetermined game presentation process information is assigned to the external storage media 12a to 12d of all the players.

FIG. 14B is an explanatory diagram of a copying operation when the game device 1 is not in the predetermined presentation setting stage in which the game device 1 can assign the predetermined game presentation process information. In this predetermined presentation non-setting stage, when no game presentation is assigned to the external storage media 12a to 12d of all the players participating in the game, a presentation process information of a game presentation that is randomly selected from the basic game presentations prepared in advance is assigned to the external storage medium 12 (here, the external storage medium 12a having a smallest card slot 17 number) of one of the players. In addition, when a predetermined game presentation is assigned to the external storage medium 12a of one of the players participating in the game, and no game presentation is assigned to the external storage media 12b to 12d of other players, presentation process information of a game presentation that is randomly selected from the basic game presentations prepared in advance is assigned to the external storage medium 12 (here, the external storage medium 12b having the smallest card slot 17 number) of one of players who are not acquirers. In addition, when the basic game presentation is assigned to the external storage medium 12a of one of the players participating in the game, and no game presentation is assigned to the external storage media 12b to 12d of other players, the presentation process information of a basic game presentation that is set as the used game presentation ID in the external storage medium 12a is assigned to the external storage medium 12 (here, the storage medium 12b having the smallest card slot 17 number) of one of persons who are not acquirers.

As described above, according to the network game system and the game device 1 according to the present invention, the process information of a game presentation that outputs an image or sound different from that of an ordinary presentation when performing a game is stored in the presentation process information storing section 43 and the presentation process information managing section 303 in association with the game presentation ID, the game presentation ID that is set as the used game presentation ID and the acquired game presentation ID in the external storage medium 12 is stored in the player information managing section 305 as a part of the player information associated with the player ID, and the information on the acquired game presentation ID, which is stored in the player information managing section 305, is appropriately updated in accordance with the game result information or the like. Accordingly, the information on the used game presentation ID and the acquired game presentation ID that are associated with the player ID of each external storage medium 12 can be easily changed.

Further, according to the network game system and the game device 1 according to the present invention, a unique case ID is assigned to each of the game devices 1 that are communicably connected through the network 2, the presentation assignment setting information of each game device 1, which enables each game device 1 to assign the process information of a predetermined game presentation to the external storage medium 12, is stored in the case information managing section 305 in association with the case ID, and, when the game device 1 is in the setting stage of a predetermined game presentation, the process information of the predetermined game presentation is assigned to the external storage media 12 of all the players who have not acquired the predetermined game presentation. By changing such a setting for each game device 1, an event or the like can be easily performed in which a game presentation is assigned by assigning predetermined date and time, a store or the like, and accordingly, the store to which the game device is set up can be more capable of attracting customers, and the players can enhance their friendship.

Furthermore, according to the network game system and the game device 1 according to the present invention, when the game device 1 is not in the predetermined game presentation setting stage, and there is no process information of a copiable basic game presentation that is set to be used in the external storage media 12 of a plurality of players participating in a game, the presentation assignment setting information associated with the case ID is read out from the case information managing section 305 based on the case ID transmitted from the game device 1, one external storage medium 12, which has not acquired the process information of the basic game presentation designated in the presentation assignment setting information, is selected from the external storage media 12, and the basic game presentation designated in the presentation assignment setting information is assigned to the selected external storage medium 12. In this connection, when the game is performed, the game presentation is constantly assigned to each player, and therefore, the game's appeal can be increased.

Still further, according to the network game system and the game device 1 according to the present invention, when the game device 1 is not in the predetermined game presentation setting stage, and there is process information of a copiable basic game presentation set as a used game presentation ID in the external storage media 12 of a plurality of the players participating in a game, the presentation process information of a latest game presentation having the latest acquisition time stamp, which is not set for use permission in any of the external storage media 12 of players, out of the process information of the basic game presentations is read out as the latest game presentation ID to be copied. Then, when there is the external storage medium 12, in which any game presentation ID is not set as the acquired game presentation ID, out of the external storage media 12, the external storage medium 12 is selected with a high priority, and, when there is no external storage medium 12, in which any game presentation ID is not set as an acquired game presentation ID, out of the external storage media 12, the external storage medium 12 in which the game presentation ID having the oldest acquisition time is set as a used game presentation ID is selected from the external storage media 12, and the latest game presentation ID is copied to the selected external storage medium 12. Accordingly, a new game presentation is copied to a person, who is non-acquirer, not acquiring any game presentation with a high priority, and, when there is no such a person who is non-acquirer, the new game presentation is copied to a person to which the oldest game presentation is assigned with a high priority, and accordingly, more players can enjoy more types of game presentations. In addition, by participating in the same game, a game presentation that is set as a used game presentation ID in the external storage medium 12 of another player can be copied to his or her external storage medium 12, whereby the game can be enjoyed with the friendship being improved.

As described above, although an embodiment of the present invention has been described in detail, the present invention is not limited thereto, and the embodiments can be appropriately changed within the scope not departing from the concept of the present invention.

DESCRIPTION OF REFERENCE NUMERALS

1: dart game device
2: network
3: server terminal
8: display section (LCD)
9: sound output section (speaker)
10: control section (of game device)
11: communication section (of game device)
12, 12a to 12d: external storage medium (ID card)
13: external storage medium processing section
42: power source section
43: presentation process information storing section
44: update section
45: player ID transmitting section
46: presentation information storing section
47: game presentation processing section
48: game processing section
49: case ID transmitting section
301: communication section (of server terminal)
302: control section (of server terminal)
303: presentation process information managing section
304: player information managing section
305: case information managing section
306: presentation process information managing section
307: player information managing section
308: player information transmitting section
309: setting presentation updating section
310: presentation assignment setting managing section

What is claimed is:

1. A network game system comprising game devices each including an external storage medium processing section that reads out at least a player ID that is unique to a player from an external storage medium owned by the player, and a server terminal that is communicably connected to the game devices through a network, wherein the server terminal comprises:
a presentation process information managing section that stores a presentation process information used for performing a game presentation associated with a game presentation ID when the game device performs a game;
a player information managing section that stores the game presentation ID set to be permitted for use in the external storage medium as an acquired game presentation ID in association with a player ID based on the player ID transmitted from the game device;
a player information transmitting section that reads out the game presentation ID, which is set to be used in the player ID, out of the acquired game presentation IDs stored in the player information managing section as a set game presentation ID and transmits the set game presentation ID to the game device when the player ID is received from the game device; and
a presentation setting updating section that updates information on the acquired game presentation ID of the player ID that is stored in the player information managing section and transmits an update result to the game device, and wherein the game device comprises:
a player ID transmitting section that reads out the player ID through the external storage medium processing section and transmits the player ID to the server terminal;
a presentation process information storing section that stores the presentation process information in association with the game presentation ID; and
a game presentation processing section that reads out the presentation process information corresponding to the set game presentation ID from the presentation process information storing section and performs the game presentation in accordance with the set game presentation ID of the player ID transmitted from the server terminal, wherein the presentation setting updating section determines whether or not there is a copiable game presentation ID in the set game presentation IDs set in the external storage media of a plurality of players participating in the game and, when there are the copiable game presentation IDs, reads out a latest presentation processing information having a latest acquisition time stamp that is not set to be permitted for use for any of the external storage media of the plurality of players from the game presentation IDs and updates information on the acquired game presentation IDs associated with the player ID of the external storage medium that is stored in the player information managing section so as to set the game presentation ID of the latest presentation process information to be permitted for use for any external storage medium of the plurality of players.

2. A network game system comprising game devices each including an external storage medium processing section that reads out at least a player ID that is unique to a player from an external storage medium owned by the player, and a server terminal that is communicably connected to the game devices through a network, wherein the server terminal comprises:
a presentation process information managing section that stores a presentation process information used for performing a game presentation associated with a game presentation ID when the game device performs a game;
a player information managing section that stores the game presentation ID set to be permitted for use in the external storage medium as an acquired game presentation ID in association with a player ID based on the player ID transmitted from the game device;
a player information transmitting section that reads out the game presentation ID, which is set to be used in the player ID, out of the acquired game presentation IDs stored in the player information managing section as a set game presentation ID and transmits the set game presentation ID to the game device when the player ID is received from the game device; and
a presentation setting updating section that updates information on the acquired game presentation ID of the player ID that is stored in the player information managing section and transmits an update result to the game device, and
wherein the game device comprises:
a player ID transmitting section that reads out the player ID through the external storage medium processing section and transmits the player ID to the server terminal;
a presentation process information storing section that stores the presentation process information in association with the game presentation ID; and
a game presentation processing section that reads out the presentation process information corresponding to the set game presentation ID from the presentation process information storing section and performs the game presentation in accordance with the set game presentation ID of the player ID transmitted from the server terminal,
wherein the game device further includes a game device ID transmitting section that transmits a unique game device ID that is assigned to each of the game devices to the server terminal, and the server terminal further includes a presentation assignment setting managing section that stores presentation assignment setting information enabling the game device to assign predetermined presentation process information to the external storage medium in association with the game device ID transmitted from the game device.

3. The network game system according to claim 2, wherein the presentation setting updating section reads out the presentation assignment setting information associated with the game device ID from the presentation assignment setting managing section based on the game device ID transmitted from the game device and updates an information on the acquired game presentation ID associated with the player ID of the external storage medium that is stored in the player information managing section so as to set the game presentation ID of the presentation process information to be permitted for use for the external storage medium in which the presentation process information designated in the presentation assignment setting information is not set to be permitted for use.

4. The network game system according to claim 2, wherein the presentation setting updating section determines whether or not there is a copiable game presentation ID in the set game presentation IDs set in the external storage media of a plurality of players participating in the game, and, when there is no copiable game presentation ID, reads out the presentation assignment setting information associated with the game device ID from the presentation assignment setting managing section based on the game device ID transmitted from the game device, selects one external storage medium, in which the game presentation ID of the presentation process information designated in the presentation assignment setting information is not set to be permitted for use, from the external storage media, and updates the information on the acquired game presentation ID associated with the player ID of the one external storage medium that is stored in the player information managing section so as to set the game presentation ID of the presentation process information to be permitted for use for one external storage medium.

5. A client game device that is communicably connected to a server terminal through a network and has an external storage medium processing section that reads out at least a player ID that is unique to a player from an external storage medium owned by the player, the client game device comprising:
a presentation performing section that performs a presentation of a game when the game is performed;
a presentation process information storing section that stores a plurality of sets of presentation process information associated with a game presentation ID;
a player ID transmitting section that reads out the player ID through the external storage medium processing section and transmits the player ID to the server terminal;
a game presentation processing section that receives a game presentation ID that is set to be used for the player ID as a set game presentation ID from the server terminal, reads out the presentation process information corresponding to the set game presentation ID from the presentation process information storing section, and performs a game presentation; and
an update information receiving section that receives update information on the game presentation ID from the server terminal,
wherein the server terminal includes: 1) a presentation process information managing section that stores a presentation process information associated with the game presentation ID;
2) a player information managing section that stores the game presentation ID set to be permitted for use in the external storage medium as an acquired game presentation ID in association with the player ID based on the player ID transmitted by the player ID transmitting section; 3) a player information transmitting section that reads out the set game presentation ID, which is set to the player ID, out of the acquired game presentation IDs stored in the player information managing section and transmits the read-out set game presentation ID to the game presentation processing section when the player ID is received; and 4) a presentation setting updating section that updates information on the acquired game presentation ID of the player ID that is stored in the player information managing section and transmits an updated result to the update information receiving section,
wherein the presentation setting updating section determines whether or not there is a copiable game presentation ID in the set game presentation IDs set in the external storage media of a plurality of players participating in the game and, when there are the copiable game presentation IDs, reads out latest presentation processing information having a latest acquisition time stamp that is not set to be permitted for use for any of the external storage media of the plurality of players from the game presentation IDs and updates the information on the acquired game presentation IDs associated with the player ID of the external storage medium that is stored in the player information managing section so as to set the game presentation ID of the latest presentation process information to be permitted for use for any external storage medium of the plurality of players.

6. A client game device that is communicably connected to a server terminal through a network and has an external storage medium processing section that reads out at least a player ID that is unique to a player from an external storage medium owned by the player, the client game device comprising:
   a presentation performing section that performs a presentation of a game when the game is performed;
   a presentation process information storing section that stores a plurality of sets of presentation process information associated with a game presentation ID;
   a player ID transmitting section that reads out the player ID through the external storage medium processing section and transmits the player ID to the server terminal;
   a game presentation processing section that receives a game presentation ID that is set to be used for the player ID as a set game presentation ID from the server terminal, reads out the presentation process information corresponding to the set game presentation ID from the presentation process information storing section, and performs a game presentation; and
   an update information receiving section that receives update information on the game presentation ID from the server terminal,
   wherein the client game device further includes a game device ID transmitting section that transmits a unique game device ID to the server terminal, and the server terminal further comprises a presentation assignment setting managing section that stores presentation assignment setting information enabling the game device to assign predetermined presentation process information to the external storage medium in association with the game device ID transmitted from the game device.

7. The client game device according to claim 6, wherein the server terminal comprises:
   1) a presentation process information managing section that stores a presentation process information associated with the game presentation ID; 2) a player information managing section that stores the game presentation ID set to be permitted for use in the external storage medium as an acquired game presentation ID in association with the player ID based on the player ID transmitted by the player ID transmitting section; 3) a player information transmitting section that reads out the set game presentation ID, which is set to the player ID, out of the acquired game presentation IDs stored in the player information managing section and transmits the read-out set game presentation ID to the game presentation processing section when the player ID is received; and 4) a presentation setting updating section that updates information on the acquired game presentation ID of the player ID that is stored in the player information managing section and transmits an updated result to the update information receiving section,
   wherein the presentation setting updating section reads out the presentation assignment setting information associated with the game device ID from the presentation assignment setting managing section based on the game device ID transmitted from the game device and updates the information on the acquired game presentation ID associated with the player ID of the external storage medium that is stored in the player information managing section so as to set the game presentation ID of the presentation process information to be permitted for use for the external storage medium in which the presentation process information designated in the presentation assignment setting information is not set to be permitted for use.

8. The client game device according to claim 6, wherein the server terminal comprises:
   1) a presentation process information managing section that stores a presentation process information associated with the game presentation ID; 2) a player information managing section that stores the game presentation ID set to be permitted for use in the external storage medium as an acquired game presentation ID in association with the player ID based on the player ID transmitted by the player ID transmitting section; 3) a player information transmitting section that reads out the set game presentation ID, which is set to the player ID, out of the acquired game presentation IDs stored in the player information managing section and transmits the read-out set game presentation ID to the game presentation processing section when the player ID is received; and 4) a presentation setting updating section that updates information on the acquired game presentation ID of the player ID that is stored in the player information managing section and transmits an updated result to the update information receiving section,
   wherein the presentation setting updating section determines whether or not there is a copiable game presentation ID in the set game presentation IDs set in the external storage media of a plurality of players participating in the game, and, when there is no copiable game presentation ID, reads out the presentation assignment setting information associated with the game device ID from the presentation assignment setting managing section based on the game device ID transmitted from the game device, selects one external storage medium, in which the game presentation ID of the presentation process information designated in the presentation assignment setting information is not set to be permitted for use, from the external storage media, and updates the information on the acquired game presentation ID associated with the player ID of the one external storage medium that is stored in the player information managing section so as to set the game presentation ID of the presentation process information to be permitted for use for the one external storage medium.

* * * * *